US008891046B2

(12) United States Patent
Kojima

(10) Patent No.: US 8,891,046 B2
(45) Date of Patent: *Nov. 18, 2014

(54) LIQUID DROPLET EJECTION APPARATUS, METHOD FOR MANUFACTURING ELECTRO-OPTICAL APPARATUS, ELECTRO-OPTICAL APPARATUS, AND ELECTRONIC APPARATUS

(75) Inventor: Kenji Kojima, Suwa (JP)

(73) Assignee: Seiko Epson Corporation (JP)

( * ) Notice: Subject to any disclaimer, the term of this patent is extended or adjusted under 35 U.S.C. 154(b) by 434 days.

This patent is subject to a terminal disclaimer.

(21) Appl. No.: 13/289,566

(22) Filed: Nov. 4, 2011

(65) Prior Publication Data

US 2012/0050368 A1    Mar. 1, 2012

Related U.S. Application Data

(62) Division of application No. 11/974,632, filed on Oct. 15, 2007, now Pat. No. 8,075,082.

(30) Foreign Application Priority Data

Oct. 16, 2006  (JP) ................................. 2006-281684

(51) Int. Cl.
 *B41J 2/205* (2006.01)
 *B41J 29/393* (2006.01)
 *B41J 2/045* (2006.01)
 *G02B 5/20* (2006.01)

(52) U.S. Cl.
 CPC .............. *B41J 29/393* (2013.01); *B41J 2/0456* (2013.01); *B41J 2/0459* (2013.01); *B41J 2/04581* (2013.01); *G02B 5/201* (2013.01)
 USPC .......................................... 349/122; 349/192

(58) Field of Classification Search
 USPC ............ 349/122, 155, 156, 123, 192; 257/88; 438/34, 551
 See application file for complete search history.

(56) References Cited

U.S. PATENT DOCUMENTS

| | | | |
|---|---|---|---|
| 7,219,976 B2 | 5/2007 | Mori et al. | |
| 7,387,354 B2 | 6/2008 | Usuda | |
| 8,075,082 B2 * | 12/2011 | Kojima | 347/19 |
| 8,730,436 B2 * | 5/2014 | Cho et al. | 349/122 |
| 8,759,206 B2 * | 6/2014 | Kimura | 438/551 |
| 8,766,288 B2 * | 7/2014 | Chen et al. | 257/88 |
| 8,773,634 B2 * | 7/2014 | Satoh | 349/192 |
| 2005/0190225 A1 | 9/2005 | Sakamoto | |

FOREIGN PATENT DOCUMENTS

| | | |
|---|---|---|
| CN | 1517213 | 8/2004 |
| CN | 1660584 | 8/2005 |
| JP | 2002-361907 | 12/2002 |

(Continued)

*Primary Examiner* — Lamson Nguyen
(74) *Attorney, Agent, or Firm* — Harness, Dickey & Pierce, P.L.C.

(57) ABSTRACT

A liquid droplet ejection apparatus includes a writing device, a weight measuring device disposed adjacent to the writing device, and a controlling device. The writing device performs writing on a workpiece by ejecting functional liquid from at least one ink jet functional liquid droplet ejection head while moving the functional liquid droplet ejection head relative to the workpiece. The weight measuring device measures an amount of ejected droplets from a weight of the functional liquid ejected from the functional liquid droplet ejection head. The controlling device controls a driving power for the functional liquid droplet ejection head on the basis of a measurement result input from the weight measuring device.

4 Claims, 26 Drawing Sheets

(56) References Cited

FOREIGN PATENT DOCUMENTS

| JP | 2004-004915 | 1/2004 |
| JP | 2004-177262 | 6/2004 |
| JP | 2004-202325 | 7/2004 |
| JP | 2004-202776 | 7/2004 |
| JP | 2005-040690 | 2/2005 |
| JP | 2006-167544 | 6/2006 |
| JP | 2006-245720 | 9/2006 |

* cited by examiner

Fig. 4
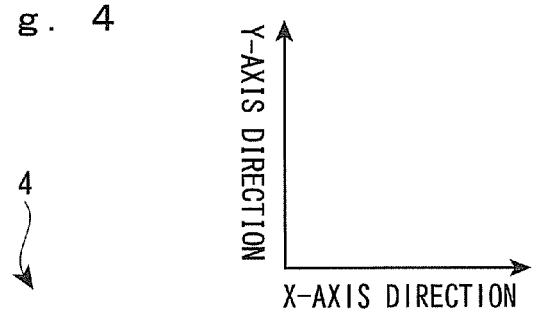
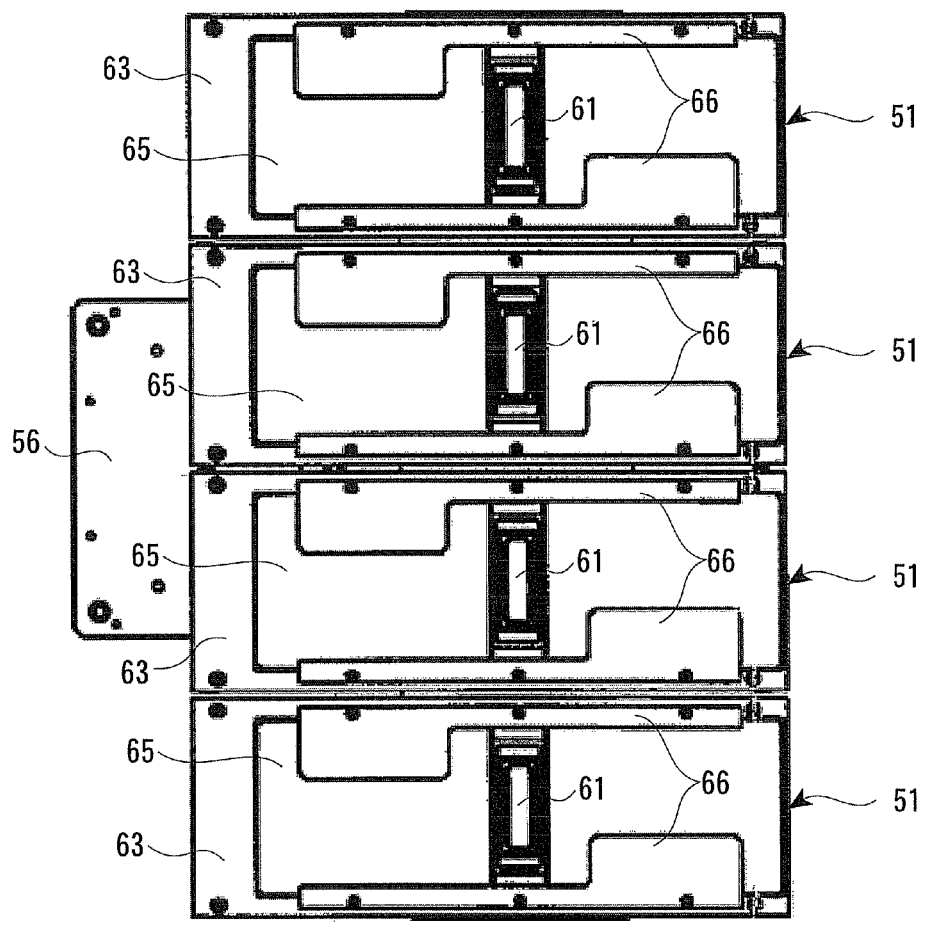

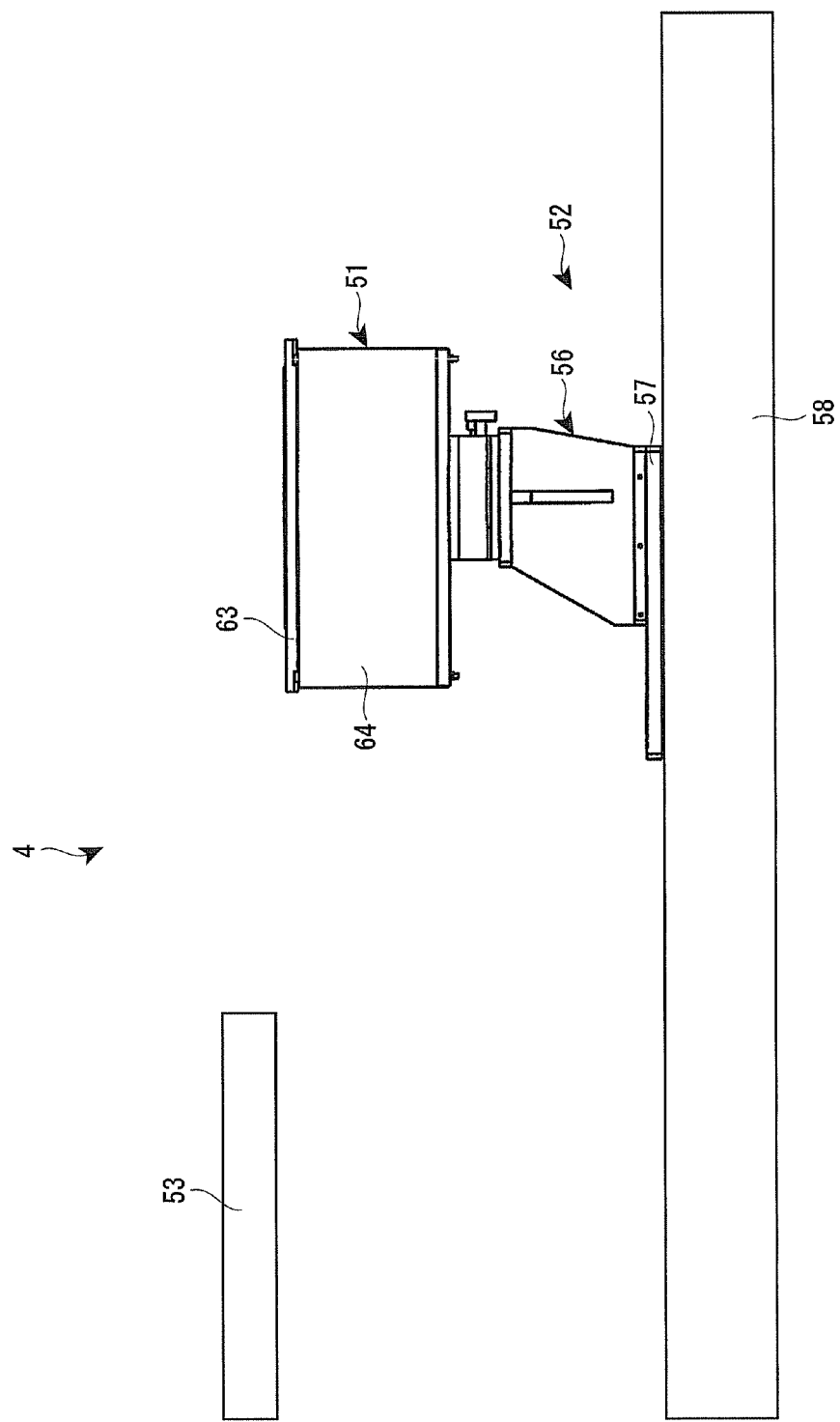

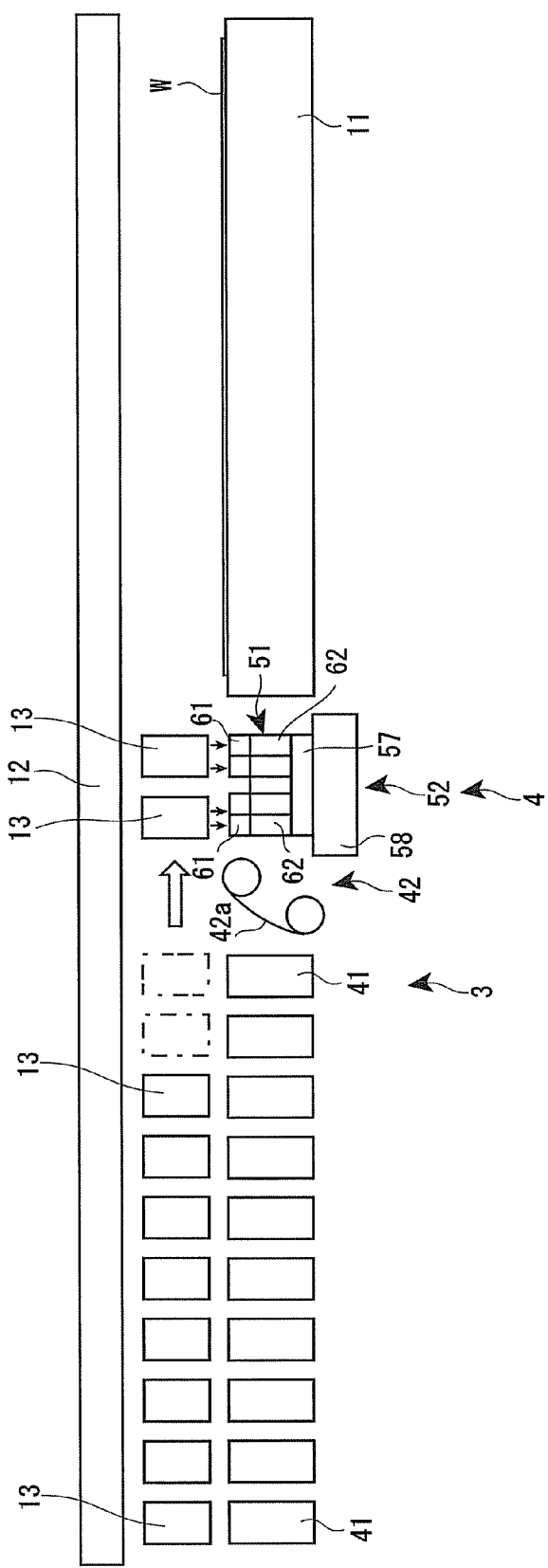

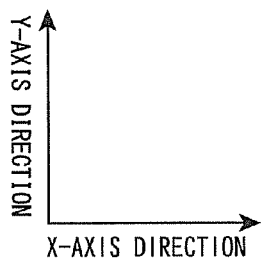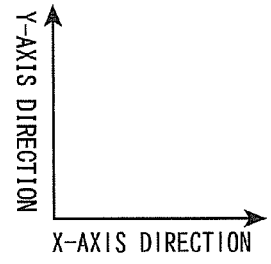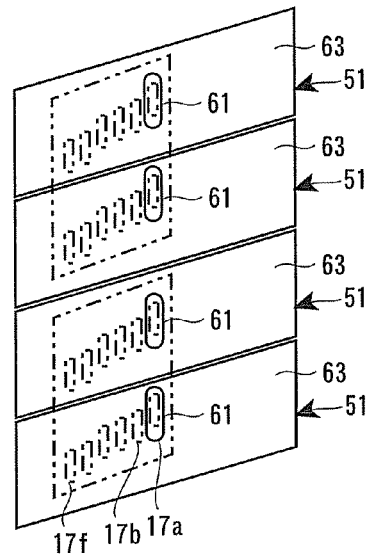
Fig. 7A
Fig. 7B
Fig. 7C
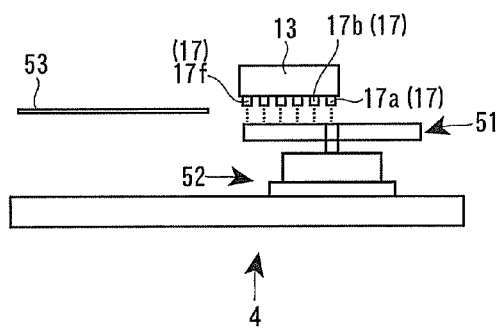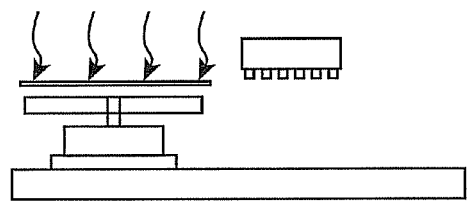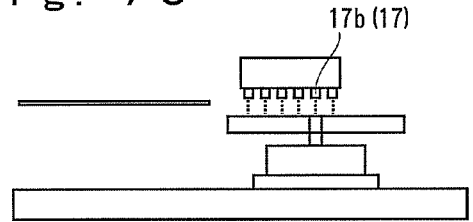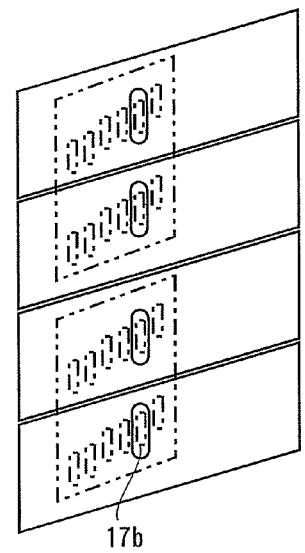

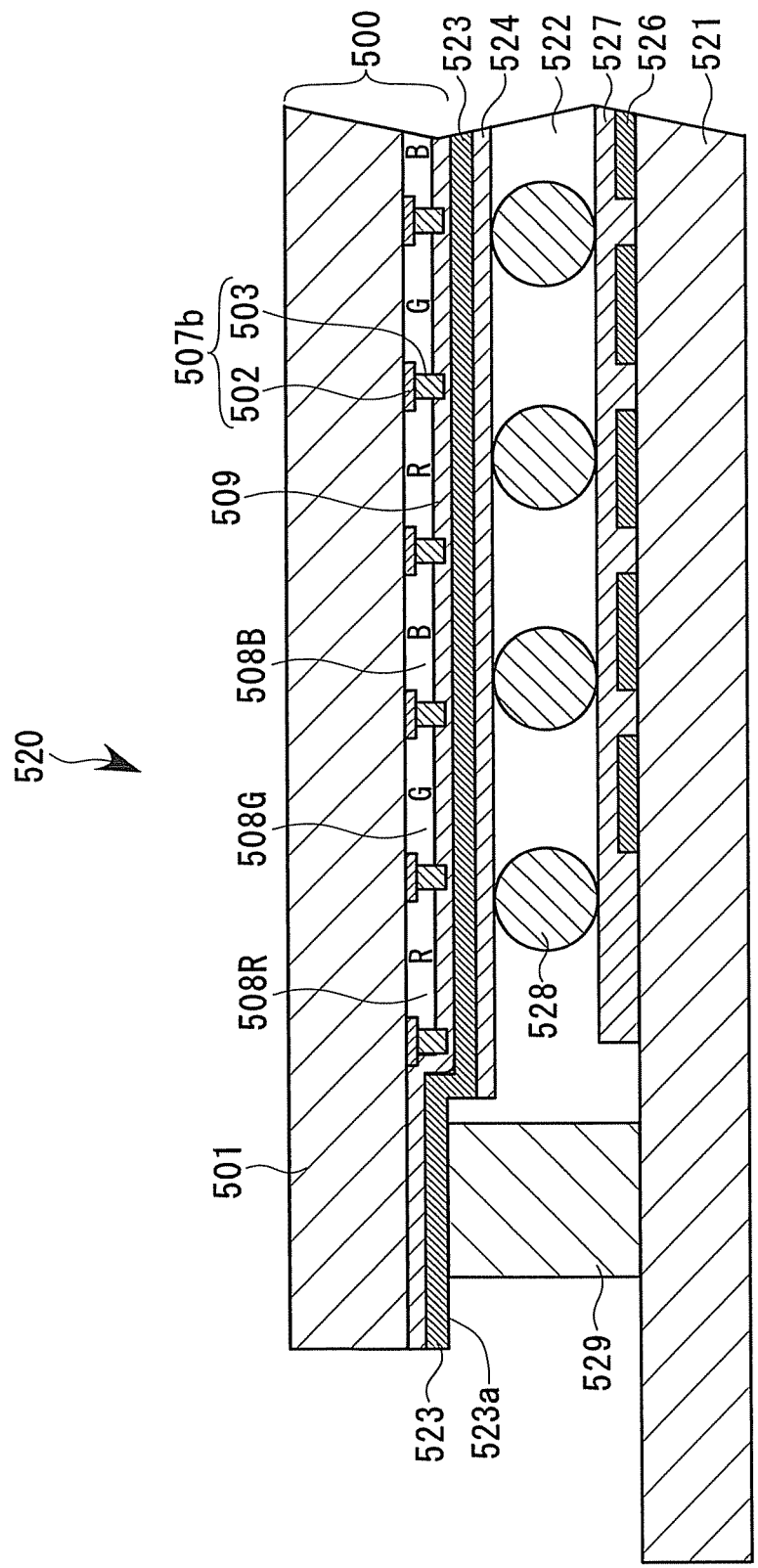

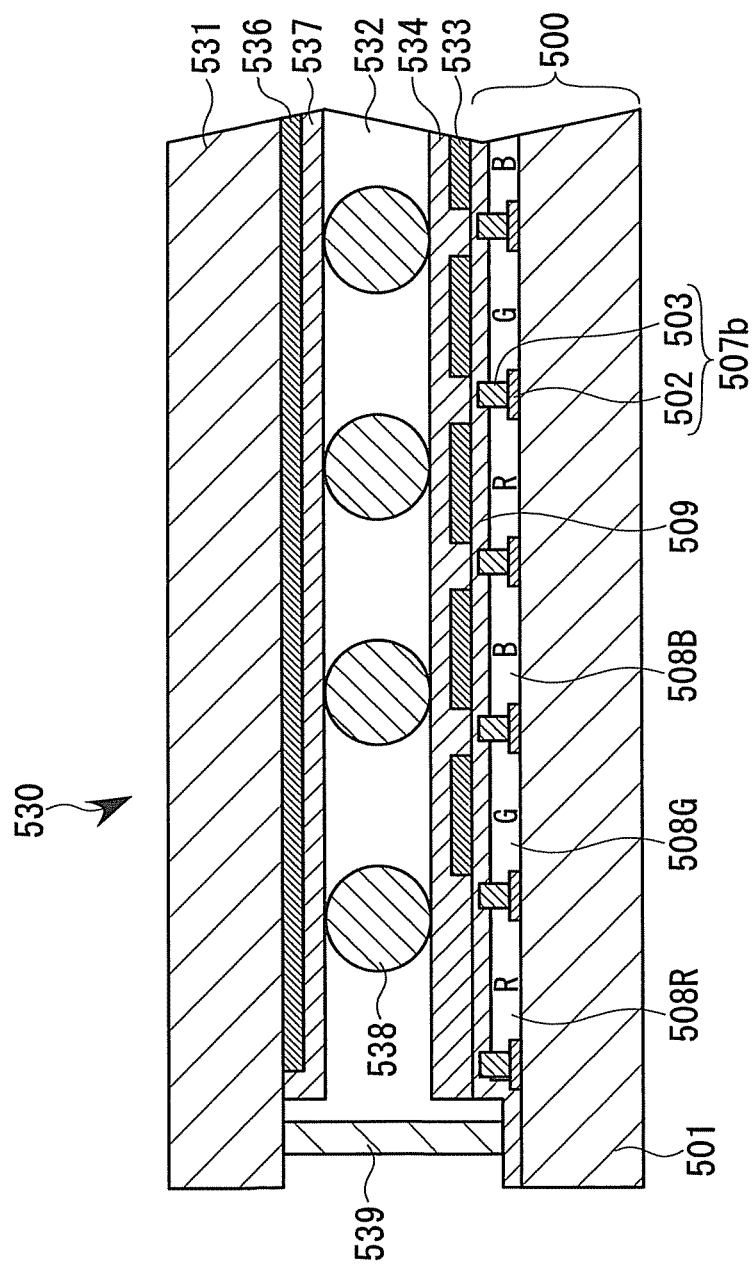

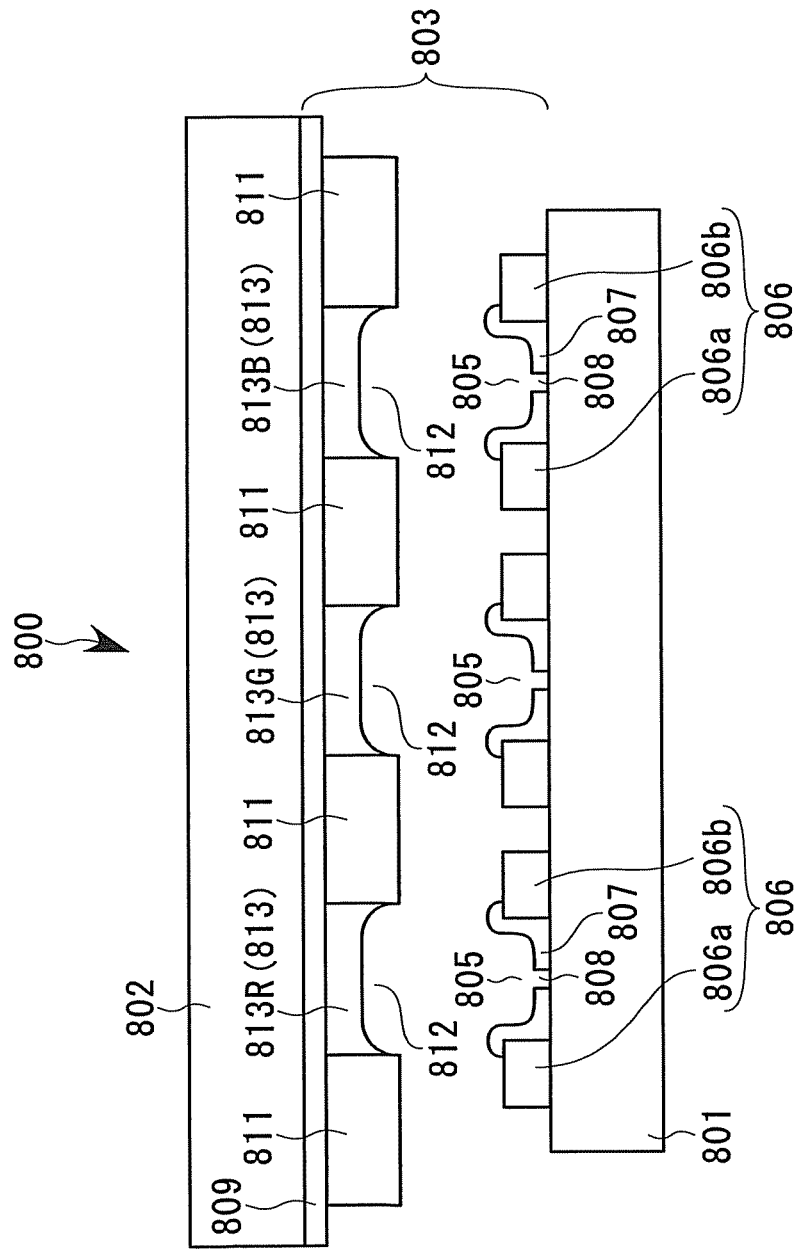

LIQUID DROPLET EJECTION APPARATUS, METHOD FOR MANUFACTURING ELECTRO-OPTICAL APPARATUS, ELECTRO-OPTICAL APPARATUS, AND ELECTRONIC APPARATUS

This is a divisional application of U.S. Ser. No. 11/974,632 filed Oct. 15, 2007, which claims priority to Japanese Application No. 2006-281684, filed Oct. 16, 2006, all of which are expressly incorporated by reference herein.

BACKGROUND

1. Technical Field

The present invention relates to a liquid droplet ejection apparatus that performs writing on a workpiece by ejecting functional liquid from an ink jet functional liquid droplet ejection head, an electro-optical apparatus, an electronic apparatus, and a method for manufacturing an electro-optical apparatus.

2. Related Art

A liquid droplet ejection apparatus including a writing unit (ejecting unit) that performs writing on a workpiece (substrate) by ejecting functional liquid from a functional liquid droplet ejection head while moving the functional liquid droplet ejection head relative to the workpiece and a weight measuring device that is disposed adjacent to the writing unit and that measures the amount of ejected droplets from the weight of the functional liquid ejected from the functional liquid droplet ejection head is known (see, for example, JP-A-2004-177262). This liquid droplet ejection apparatus adjusts a driving power for the functional liquid droplet ejection head on the basis of a result of measurement performed by the weight measuring device.

However, for such a known liquid droplet ejection apparatus, the driving power is adjusted by the user on the basis of the measurement result, so it takes time for the measurement result to be reflected in the driving power. This makes it difficult to quickly respond to the measurement result. In addition, adjusting is a laborious task for the user.

SUMMARY

An advantage of some aspects of the invention is that it provides a liquid droplet ejection apparatus that can quickly reflect a measurement result in a driving power for a functional liquid droplet ejection head, an electro-optical apparatus, an electronic apparatus, and a method for manufacturing an electro-optical apparatus.

According to a first aspect of the invention, a liquid droplet ejection apparatus includes a writing device, a weight measuring device disposed adjacent to the writing device, and a controlling device. The writing device performs writing on a workpiece by ejecting functional liquid from at least one ink jet functional liquid droplet ejection head while moving the functional liquid droplet ejection head relative to the workpiece. The weight measuring device measures an amount of ejected droplets on the basis of a weight of the functional liquid ejected from the functional liquid droplet ejection head. The controlling device controls a driving power for the functional liquid droplet ejection head on the basis of a measurement result input from the weight measuring device.

In accordance with the above structure, the driving power for the functional liquid droplet ejection head is controlled based on the measurement result input from the weight measuring device by the controlling device, not by a user. Therefore, compared with a structure in which the user adjusts the driving power on the basis of the measurement result, the result of measurement of the amount of ejected liquid droplets can be quickly reflected in the driving power for the functional liquid droplet ejection head.

In this case, preferably, the liquid droplet ejection apparatus according to claim 1 may further include a cleaning device that sucks the functional liquid in the functional liquid droplet ejection head and wipes the functional liquid droplet ejection head. The writing device may include an x-axis table that mounts the workpiece thereon and that moves the workpiece in the x-axis direction and a y-axis table that mounts the functional liquid droplet ejection head thereon and that moves the functional liquid droplet ejection head in the y-axis direction. The cleaning device may be disposed in a path of movement of the functional liquid droplet ejection head in the y-axis direction. The weight measuring device may be disposed between the x-axis table and the cleaning device in a path of movement of the functional liquid droplet ejection head.

In accordance with the structure described above, (the nozzles of) the functional liquid droplet ejection head can face the weight measuring device after having been cleaned by the cleaning device. Therefore, inability to measure weight and defects of weight measurement caused by ejection defects of the functional liquid droplet ejection head can be efficiently reduced. In addition, tact time required for a series of steps of suction, wiping, weight measurement, and writing can be shortened.

In this case, preferably, the at least one functional liquid droplet ejection head may include a plurality of functional liquid droplet ejection heads. The weight measuring device may include a container that receives functional liquid ejected from any one of the functional liquid droplet ejection heads, an electronic balance that measures a weight of the functional liquid in the container, and a flushing box disposed around the container. While the functional liquid droplet ejection head performs measurement ejection on the container, the flushing box receives waste ejection from the other functional liquid droplet ejection heads.

In accordance with the structure described above, while any one of the functional liquid droplet ejection heads ejects functional liquid to be measured, the other functional liquid droplet ejection heads being in a state waiting for completion of the measurement ejection can perform waste ejection. This can prevent the nozzles from being dried in the waiting state, result in good measurement ejection after the waiting state ends, and lead to obtainment of appropriate measurement results.

In this case, preferably, the liquid droplet ejection apparatus may further include a sub-table that moves the weight measuring device in the x-axis direction. The plurality of functional liquid droplet ejection heads may be arranged in the x-axis direction and divided into head groups.

In accordance with the structure described above, for the apparatus having the plurality of functional liquid droplet ejection heads, the plurality of functional liquid droplet ejection heads can sequentially face the weight measuring device with ease.

In this case, preferably, the liquid droplet ejection apparatus may further include a windshield cover that covers a space above the container when the weight of the functional liquid is measured by the electronic balance, the windshield cover being disposed in a path of movement of the sub-table.

In accordance with the structure described above, during weight measurement, because the sub-table has moved the weight measuring device under the windshield cover, the electronic balance can accurately measure the weight without being affected by an air current.

According to a second aspect of the invention, a method for manufacturing an electro-optical apparatus forms a film on the substrate using the liquid droplet ejection apparatus.

According to a third aspect of the invention, an electro-optical apparatus includes the workpiece on which a film is formed using the liquid droplet ejection apparatus.

In accordance with these structures, the use of the liquid droplet ejection apparatus capable of quickly reflecting the measurement result of the amount of ejected droplets in the driving power for the functional liquid droplet ejection head enables efficient manufacture of a high-quality electro-optical apparatus. Examples of the electro-optical apparatus (flat panel display (FPD)) include a color filter, a liquid crystal display apparatus, an organic EL apparatus, a plasma display panel (PDP) apparatus, and an electron emission apparatus. Examples of the electron emission apparatus include a field emission display (FED) and a surface-conduction electron-emitter display (SED). Other examples of the electro-optical apparatus include apparatuses for forming metallic wiring, a lens, a resist, and a light diffuser.

According to a fourth aspect of the invention, an electronic apparatus includes the electro-optical apparatus manufactured by the method or including the electro-optical apparatus.

In this case, examples of the electronic apparatus include various electrical products, in addition to a cellular phone and a personal computer that incorporate a flat panel display.

BRIEF DESCRIPTION OF THE DRAWINGS

The invention will be described with reference to the accompanying drawings, wherein like numbers reference like elements.

FIG. 4 is a plan view of a weight measuring unit.

FIG. 5 is a front view of the weight measuring unit.

FIG. 6 is a schematic front view of the liquid droplet ejection apparatus.

FIGS. 7A to 7C are illustrations for describing a series of operations for weight measurement performed by the liquid droplet ejection apparatus.

FIG. 11 is a cross-sectional view illustrating main portions of a general structure of a first example of a liquid crystal apparatus that includes a color filter to which an aspect of the invention is applied.

FIG. 12 is a cross-sectional view illustrating main portions of a general structure of a second example of a liquid crystal apparatus that includes a color filter to which an aspect of the invention is applied.

FIG. 25 is a cross-sectional view of main portions of an electron emission display apparatus (a field emission display (FED) apparatus).

DESCRIPTION OF EXEMPLARY EMBODIMENTS

Embodiments of the invention are described below with reference to the accompanying drawings. A liquid droplet ejection apparatus according to a present embodiment is incorporated in a manufacturing line for a flat panel display. The liquid droplet ejection apparatus forms (by ink jet printing) a light-emitting element included in a pixel of a color filter in a liquid crystal display apparatus or an organic EL apparatus using a functional liquid droplet ejection head in which functional liquid, such as a special ink or luminous resin liquid, is introduced.

Figure 1:
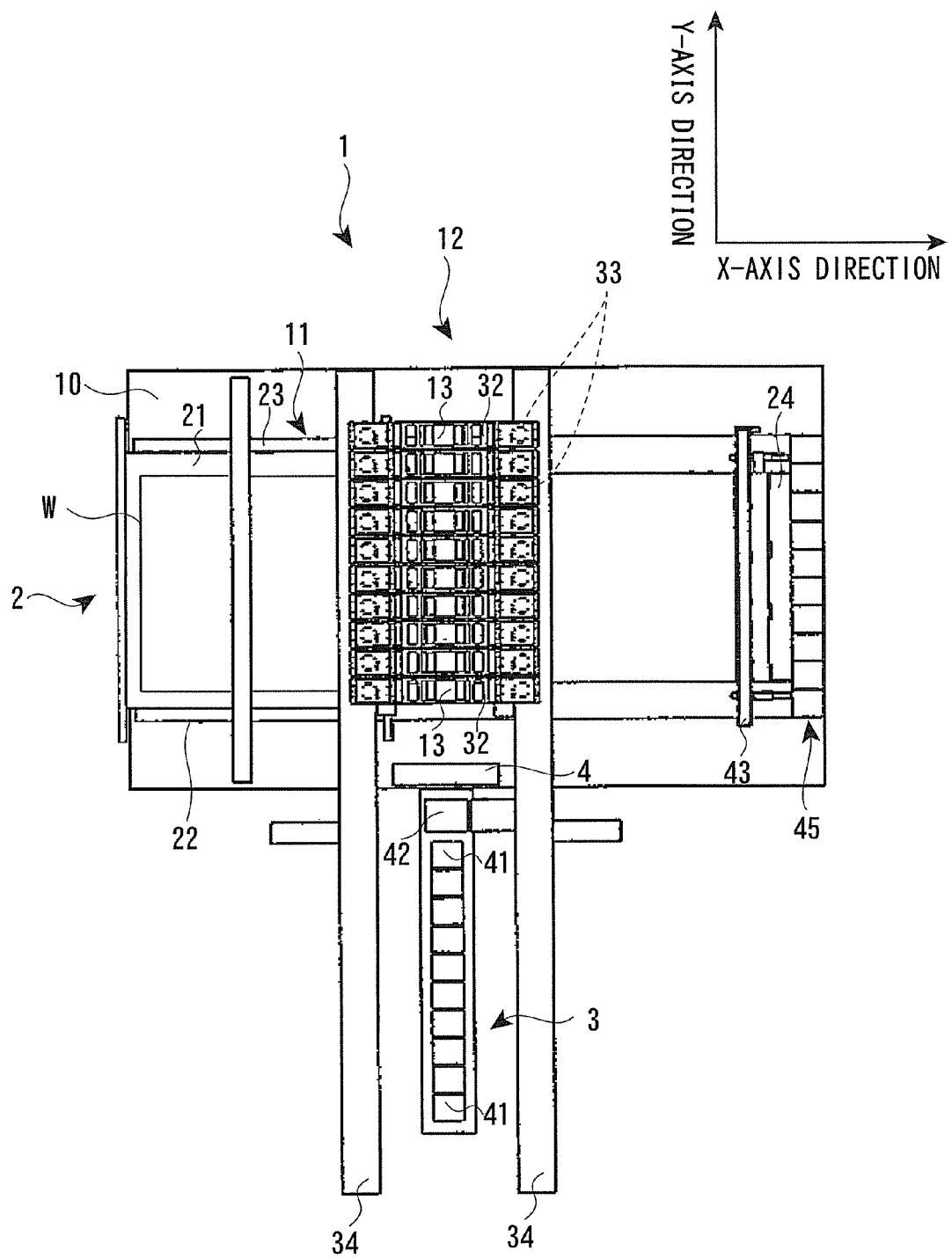
FIG. 1 is a plan view of a liquid droplet ejection apparatus according to an embodiment of the invention.
Figure 2:
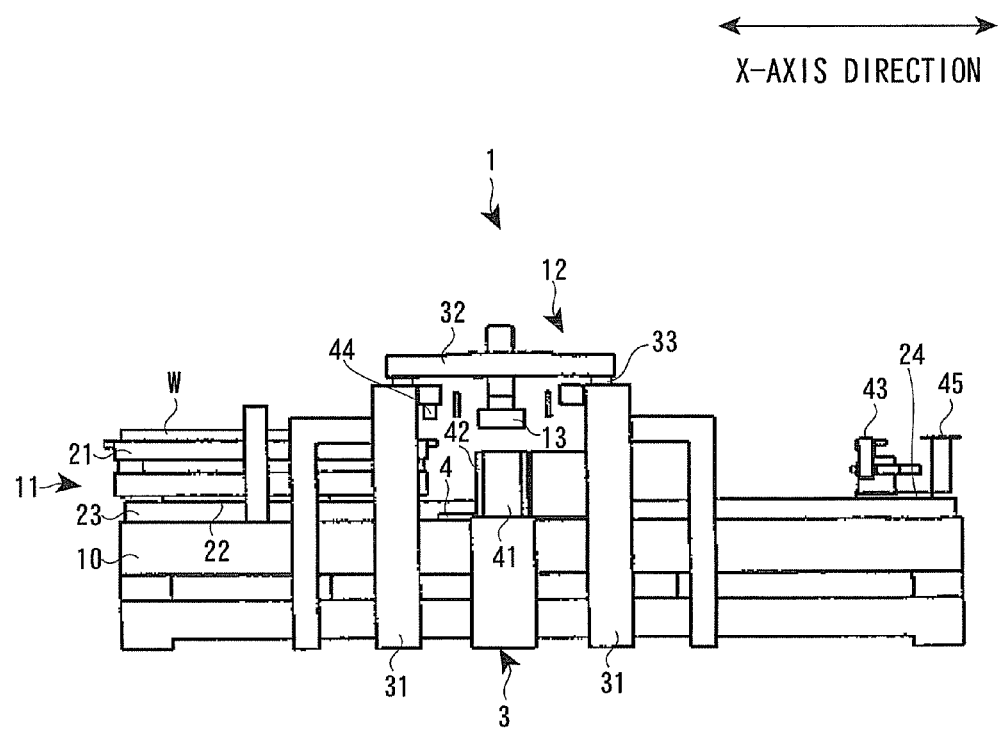
FIG. 2 is a side view of the liquid droplet ejection apparatus.

As illustrated in FIGS. 1 and 2, a liquid droplet ejection apparatus 1 includes a writing device 2 on which a plurality of functional liquid droplet ejection heads 17 (see FIG. 3) are mounted, a cleaning device 3 extending in the y-axis direction, a weight measuring unit 4 disposed between the writing device 2 and the cleaning device 3, and a controlling device 5 (see FIG. 5). The controlling device includes a programmable logic controller (PLC) having a central processing unit (CPU) and a memory. The liquid droplet ejection apparatus 1 is accommodated in a chamber (not shown) capable of forming, for example, a dry air atmosphere.

The writing device 2 includes an x-axis table 11 on an x-axis support base 10 (e.g., granite surface plate), a y-axis table 12 orthogonal to the x-axis direction, and a plurality of (e.g., ten) movable carriages 13 suspended from the y-axis table 12.

The x-axis table 11 includes a set table 21 on which a substrate W is mountable, an x-axis slider 22 slidably supporting the set table 21, and an x-axis moving mechanism (linear motor) 23 for moving the x-axis slider 22 in the x direction. The use of the x-axis moving mechanism 23 enables the set table 21 (substrate W) to be reciprocated in the x-axis direction via the x-axis slider 22 relative to the functional liquid droplet ejection heads 17.

The x-axis table 11 further includes an inspection table 43, which will be described below, and a maintenance slider 24 slidably supporting a periodic flushing unit 45. The x-axis slider 22 and the maintenance slider 24 are individually movable.

The y-axis table 12 is supported by a strut 31 and extends over the x-axis table 11 and the cleaning device 3. The y-axis table 12 includes a plurality of (e.g., ten) bridge plates 32 suspending the respective carriages 13, a plurality of (e.g., ten) pairs of y-axis sliders 33 slidably supporting the both ends of the respective bridge plates 32 and a pair of y-axis moving mechanisms (linear motors) 34 capable of moving the y-axis sliders 33 in the y-axis direction. The use of the pair of y-axis moving mechanisms 34 enables the carriages 13 to be individually moved in the y-axis direction via the respective pairs of y-axis sliders 33. That is, the y-axis table 12 can move the carriages 13 across the x-axis table 11, the weight measuring unit 4, and units of the cleaning device 3, which will be described below.

Figure 3:
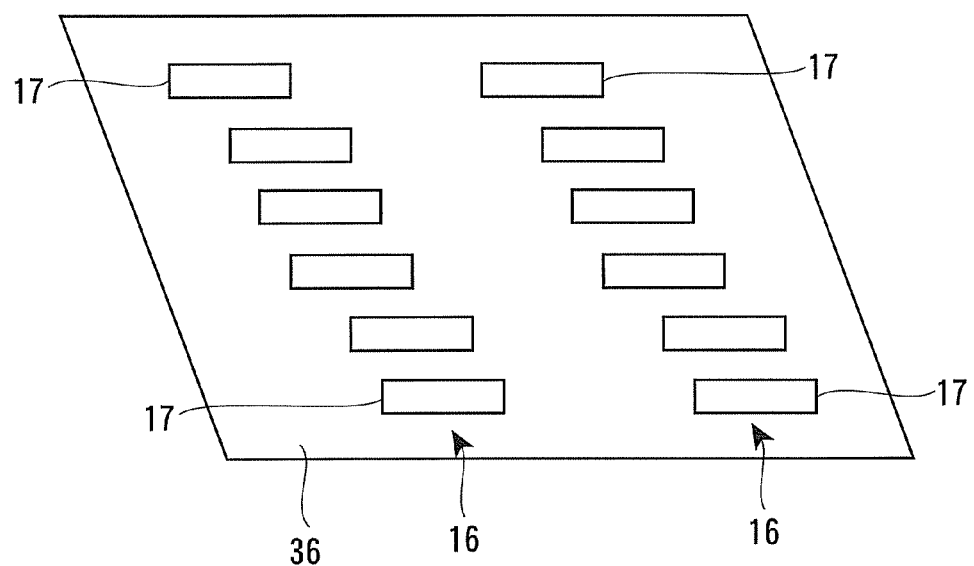
FIG. 3 illustrates functional liquid droplet ejection heads divided into head groups.

As illustrated in FIG. 3, the plurality of (e.g., 12) functional liquid droplet ejection heads 17 are mounted on a carriage plate 36 in each of the carriages 13. The 12 functional liquid droplet ejection heads 17 are divided into two groups in the y-axis direction and one head group 16 includes six functional liquid droplet ejection heads 17 arranged in the x-axis direction. All the functional liquid droplet ejection heads 17 (12×10) mounted on the carriages 13 form a continuous writing line in the y-axis direction. The length of the writing line corresponds to the maximum width of the substrate W mountable on the set table 21.

Each of the functional liquid droplet ejection heads 17 receives functional liquid supplied from a functional liquid pack (not shown) and ejects the functional liquid by an ink jet method (e.g., driving of a piezoelectric element). Application of a driving power from a head driver 38 (see FIG. 8) causes the functional liquid to be ejected from a plurality of nozzles (e.g., 180×2 rows). The driving power is controlled by the controlling device 5 on the basis of a measurement result input from a plurality of weight measurement devices 51, which will be described below. The details of the control will be described below.

The writing device 2 having the structure described above ejects functional liquid to the substrate W and performs writing thereon under control of the controlling device 5. That is, the writing device 2 reciprocates the substrate W relative to the functional liquid droplet ejection heads 17 using the x-axis table 11 and, in synchronization therewith, drives the functional liquid droplet ejection heads 17 and performs writing on the substrate W.

As illustrated in FIGS. 1 and 2, the cleaning device 3 includes a plurality of (e.g., ten) suction units 41 and a single wiping unit 42, which is more adjacent to the x-axis table 11 than are the suction units 41. The suction units 41 and the wiping unit 42 are disposed along the path of movement of the functional liquid droplet ejection heads 17 caused by the y-axis table 12 such that the carriages 13 can face each of these units.

The plurality of suction units 41 correspond to the plurality of carriages 13. Each of the suction units 41 sucks functional liquid from the nozzles of each of the functional liquid droplet ejection heads 17 through a head cap (not shown) sealing the surfaces of the nozzles of the functional liquid droplet ejection head 17, performs cleaning, and initially charges functional liquid. The wiping unit 42 wipes the nozzle surfaces of the functional liquid droplet ejection head 17 soiled with attached functional liquid for each of the carriages 13 by a cleaning operation using a wiping sheet 42*a* (see FIG. 6).

As described above, the maintenance slider 24 supports the inspection table 43 and the periodic flushing unit 45. The inspection table 43 receives inspection ejection for inspecting the functional liquid droplet ejection head 17 for ejection defects. The image of an inspection pattern for ejection is captured by an inspection camera 44. The controlling device 5 recognizes the image and determines whether ejection defects occur. The periodic flushing unit 45 receives waste ejection performed to prevent the nozzles of the functional liquid droplet ejection head 17 from being dried during replacement of the substrate W with a next one.

As illustrated in FIGS. 4 and 5, the weight measuring unit 4 includes the plurality of (e.g., four) weight measurement devices 51 and a sub-table 52 for moving the weight measurement devices 51 in the x-axis direction and, a windshield cover 53 (shown in FIG. 5) disposed in the path of movement of the sub-table 52.

The sub-table 52 includes a support frame 56 collectively supporting the plurality of weight measurement devices 51, a weight measurement slider 57 supporting the weight measurement devices 51 so as to allow them to slide in the x-axis direction, and a motor-driven weight measurement moving mechanism 58 for sliding the weight measurement slider 57 in the x-axis direction.

The weight measurement devices 51 are aligned in the y-axis direction. One of the weight measurement devices 51 corresponds to one of the head groups 16. Therefore, weight is measured by the four weight measurement devices 51 for every two of the carriages 13.

Each of the weight measurement devices 51 includes a container 61 for receiving functional liquid ejected from any one of the six functional liquid droplet ejection heads 17 of the head group 16, an electronic balance 62 (see FIG. 6) for measuring the weight of functional liquid via the container 61, a flushing box 63 surrounding the container 61, and a casing 64 accommodating and supporting these elements. A functional-liquid absorber 65 is laid in the flushing box such that both longer sides of the functional-liquid absorber 65 are pressed by a pair of pressing plates 66. The flushing box 63 receives waste ejection from the other five functional liquid droplet ejection heads 17 when one functional liquid droplet ejection head 17 ejects functional liquid to be measured to the container 61.

According to the present embodiment, a single weight measurement device 51 performs measurement on six functional liquid droplet ejection heads 17. Therefore, while any one of the first functional liquid droplet ejection heads 17 ejects functional liquid to be measured, the other five functional liquid droplet ejection heads 17 need to wait for completion of the measurement ejection. These five functional liquid droplet ejection heads 17 being in the waiting state can perform waste ejection. This can prevent the nozzles from being dried in a waiting state, result in good ejection for measurement after the waiting state ends, and lead to obtainment of appropriate measurement results.

A series of operations for weight measurement is now be described below with reference to FIGS. 6 and 7. First, two carriages 13 adjacent to the weight measuring unit 4 among all the carriages 13 facing the suction units are moved in the y-axis direction, wiped by the wiping unit 42, and then set so as to face the weight measuring unit 4. Alternatively, all the carriages 13 may be moved from the suction units 41 to the inspection table 43 and eject functional liquid to be measured, and the inspection camera 44 may determine normal ejection for all the nozzles before the carriages 13 are moved so as to face the weight measuring unit 4 for every two of the carriages 13.

Subsequently, the sub-table 52 sets the container 61 of each of the weight measurement devices 51 to face a first functional liquid droplet ejection head 17a in the each of the head groups 16. Functional liquid to be measured is ejected from all the nozzles of the first functional liquid droplet ejection head 17a to the container 61. At this time, second to sixth functional liquid droplet ejection heads 17b to 17f in the head group 16 perform waste ejection to the flushing box 63 (see FIG. 7A).

Then, the container 61 is moved under the windshield cover 53 by the sub-table 52. In this state, the amount of ejected droplets is measured by the electronic balance 62 (see FIG. 7B). Because the electronic balance 62 is shielded from an air current (e.g., a downward air current or a turbulent flow caused by a chamber) by the windshield cover 53, the weight can be accurately measured without being affected by the air current.

After the amount of liquid droplets ejected from the first functional liquid droplet ejection head 17a is measured, the second functional liquid droplet ejection head 17b is set so as to face the container 61 and ejects functional liquid to be measured in a similar way (see FIG. 7C). Similarly, the amounts of droplets ejected from the six functional liquid droplet ejection heads 17 in the head group 16 are sequentially measured. Here, the amount of droplets ejected from all the nozzles of each of the functional liquid droplet ejection heads 17 is measured. However, the invention is not limited to this structure. For example, the amount of ejected droplets may be measured for each nozzle row, or may further be measured for each nozzle.

Figure 8:
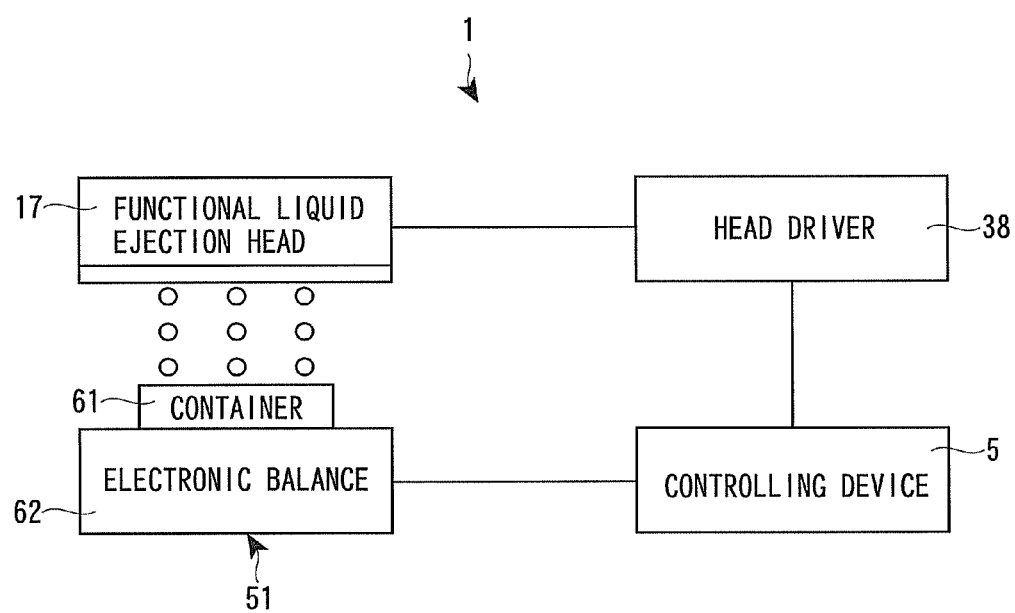
FIG. 8 is a control block diagram for describing how a driving power for the functional liquid droplet ejection head is controlled based on a result of measurement performed by a weight measuring device.

FIG. 8 is a control block diagram for describing how a driving power for the functional liquid droplet ejection head 17 is controlled based on a result of measurement performed by the weight measurement device 51. The electronic balance 62 outputs a measurement result determined in the above-described way to the controlling device 5. The controlling device 5 controls a driving power (voltage value) to be applied from the head driver 38 to the functional liquid droplet ejection head 17 on the basis of the result of measurement performed by the electronic balance 62. More specifically, when the result of weight measurement falls within a target range, the next substrate W is written without a change of the voltage value. When the result of weight measurement falls outside the target range, the voltage value is changed based on data on resolving power for a previously determined applied voltage value and the measured weight value. The weight is measured again using the changed voltage value. Measuring the weight and changing the voltage value are repeated until the result of weight measurement falls in the target range.

As described above, in accordance with the liquid droplet ejection apparatus 1 according to the present embodiment, a driving power for the functional liquid droplet ejection head 17 is controlled based on a measurement result input from the weight measurement device 51, not by a user. Therefore, compared with a structure in which the user adjusts a driving power on the basis of a measurement result, the result of measurement of the amount of ejected droplets can be quickly reflected in the driving power for the functional liquid droplet ejection head 17.

Examples of an electro-optical apparatus (flat panel display) manufactured using the liquid droplet ejection apparatus 1 according to the embodiment described above include a color filter, a liquid crystal display, an organic EL display, a plasma display panel (PDP) apparatus, and an electron emission display (field emission display (FED) and a surface-conduction electron-emitter display (SED)). Exemplary structures of these examples and an active matrix substrate formed therein and methods for manufacturing the same will now be described below. The active matrix substrate is a substrate in which a thin film transistor and source and data lines electrically connected thereto are formed.

Figure 9:
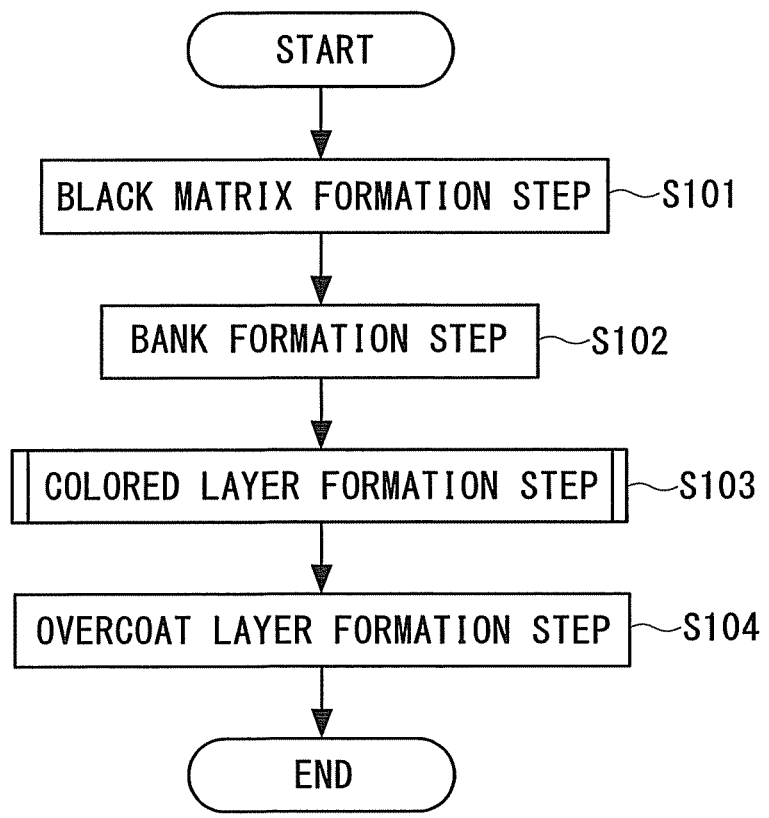
FIG. 9 is a flowchart of a process for manufacturing a color filter.

First, a method for manufacturing a color filter incorporated in a liquid crystal display, an organic EL display, or other displays is described. FIG. 9 is a flowchart of a process for manufacturing a color filter. FIGS. 10A to 10E are schematic cross-sectional views of a color filter 500 (filter base 500A) according to an embodiment for each step in sequence.

Figure 10A:
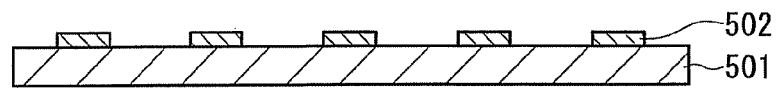
FIGS. 10A to 10E are schematic cross-sectional views of a color filter for each step in sequence.

In a black matrix formation step (S101), as illustrated in FIG. 10A, a black matrix 502 is formed on a substrate (W) 501. The black matrix 502 is made of metallic chromium, a layered structure of metallic chromium and chromium oxide, or a resin black matrix. The black matrix 502 can be made of a thin metal film by, for example, sputtering or vapor deposition. The black matrix 502 can be made of a thin resin film by gravure printing or using a photoresist process or a thermal transfer process.

Figure 10B:
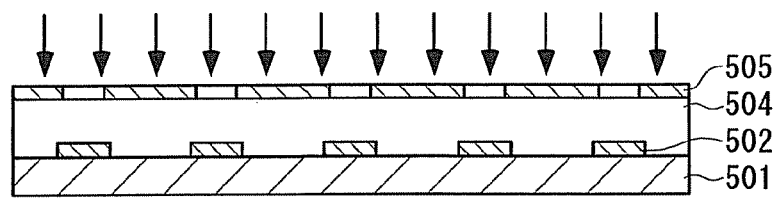

Subsequently, in a bank formation step (S102), a bank 503 is superposed on the black matrix 502. First, as illustrated in FIG. 10B, a resist layer 504 made of a transparent negative photosensitive resin is formed so as to cover the substrate 501 and the black matrix 502. Then, an upper surface of the resist layer is coated with a mask film 505 having a matrix pattern shape, and the structure is exposed.

Figure 10C:
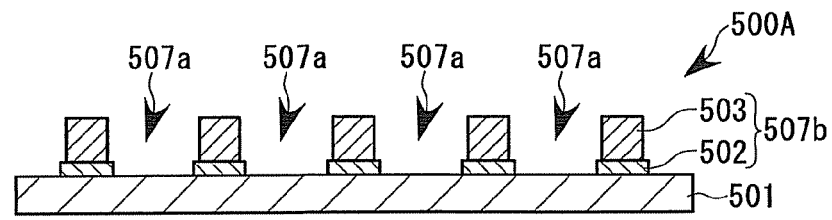

Then, as illustrated in FIG. 10C, the resist layer 504 is patterned by etching of an unexposed portion of the resist layer 504, thus forming the bank 503. When the black matrix 502 is made of a resin black matrix, the black matrix 502 can also serve as the bank 503.

The bank 503 and the black matrix 502 disposed thereunder constitute a partition 507b dividing pixel regions 507a. The partition 507b defines a target area for ejection of functional liquid droplets when colored layers (film portions) 508R, 508G, and 508B are formed using the functional liquid droplet ejection heads 17 in a colored layer formation step described below.

The filter base 500A is obtained through the black matrix formation step and the bank formation step described above.

In the present embodiment, the bank 503 is made of a resin material that allows the bank 503 to have a lyophobic (hydrophobic) coated film surface. Because the substrate (glass substrate) 501 has a lyophilic (hydrophilic), variations of points where droplets are ejected to reach each of the pixel regions 507a surrounded by the bank 503 can be automatically reduced in the colored layer formation step described below.

Figure 10D:
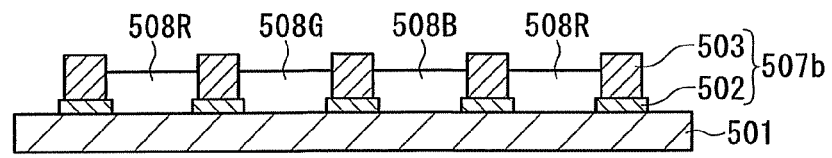

In the colored layer formation step (S103), as illustrated in FIG. 10D, functional liquid is ejected from the functional liquid droplet ejection heads 17 into the respective pixel regions 507a surrounded by the bank 503. In this case, droplets of the functional liquid are ejected using the functional liquid droplet ejection heads 17 in which functional liquids (filter materials) of three colors of red, green, and blue (RGB). Examples of a layout pattern of the three colors of RGB include a stripe pattern, a mosaic pattern, and a delta pattern.

Figure 10E:
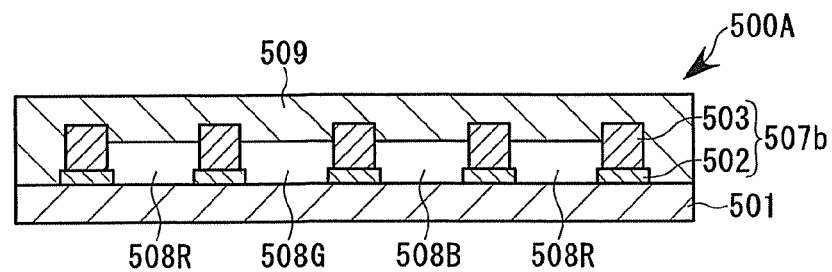

Thereafter, the functional liquids are fixed through drying treatment (e.g., heating), and then the colored layers 508R, 508G, and 508B corresponding to the respective three colors are formed. After the formation of these colored layers 508R, 508G, and 508B, flow proceeds to an overcoat layer formation step (S104), where an overcoat layer 509 is formed so as to cover the upper surfaces of the substrate 501, the partition 507b, and the colored layers 508R, 508G, and 508B, as illustrated in FIG. 10E.

More specifically, overcoat-layer coating liquid is ejected to the entire surface of the substrate 501 with the colored layers 508R, 508G, and 508B formed thereon, and then the overcoat layer 509 is formed through drying treatment.

After the formation of the overcoat layer 509, the color filter 500 proceeds to the next film formation step of forming a transparent electrode made of, for example, indium tin oxide (ITO).

FIG. 11 is a cross-sectional view illustrating main portions of a general structure of a passive matrix liquid crystal apparatus (liquid crystal apparatus) 520 as a first example of a liquid crystal display that includes the color filter 500. A transmissive liquid crystal display is obtained as a final product by mounting of ancillary parts, such as an IC for driving a liquid crystal layer, a backlight, and a support, on the liquid crystal apparatus. The color filter 500 shown in FIG. 11 is the same as that in FIG. 10, so the same reference numerals are used in the corresponding elements in FIG. 11. The detailed description thereof is not repeated here.

The liquid crystal apparatus 520 includes the color filter 500, a counter substrate 521 (e.g., a glass substrate), and a liquid crystal layer 522 being made of a super twisted nematic (STN) liquid crystal composite and being sandwiched between the color filter 500 and the counter substrate 521. The color filter 500 is disposed at the upper side in the drawing (adjacent to an observer).

Although not illustrated, a polarizer is disposed adjacent to an outer surface (i.e., a surface remote from the liquid crystal layer 522) of each of the counter substrate 521 and the color filter 500, and a backlight is disposed outside the polarizer facing the counter substrate 521.

A plurality of first electrodes 523 are spaced at predetermined intervals on the overcoat layer 509 of the color filter 500 (adjacent to the liquid crystal layer 522). Each of the first electrodes 523 has a strip shape whose longer side extends horizontally in the drawing. A first alignment layer 524 is formed so as to cover a surface of the first electrode 523 that is remote from the color filter 500.

A plurality of second electrodes 526 are spaced at predetermined intervals on a surface of the counter substrate 521 that faces the color filter 500. Each of the second electrodes 526 has a strip shape whose longer side extends in a direction substantially orthogonal to the longer side of the first electrode 523 disposed adjacent to the color filter 500. A second alignment layer 527 is formed so as to cover a surface of the second electrode 526 that is adjacent to the liquid crystal layer 522. Each of the first electrode 523 and the second electrode 526 can be made of a transparent conductive material, such as ITO.

One or more spacers 528 are disposed in the liquid crystal layer 522 to maintain the thickness of the liquid crystal layer 522 (cell gap) constant. A sealant 529 functions to prevent the liquid crystal composite in the liquid crystal layer 522 from leaking out. A first end of the first electrode 523 extends as an interconnection line 523a outside the sealant 529.

The intersections of the first electrodes 523 and the second electrodes 526 correspond to pixels, and the colored layers 508R, 508G, and 508B of the color filter 500 are positioned in the pixels.

In normal manufacturing processes, the color filter 500 is subjected to patterning for the first electrodes 523 and coating of the first alignment layer 524 to prepare the surroundings of the color filter 500, and the counter substrate 521 is subjected to patterning for the second electrodes 526 and coating of the second alignment layer 527 to prepare the surroundings of the counter substrate 521. Then, the spacers 528 and the sealant 529 are built on the counter substrate 521 with the second electrode 526 and the second alignment layer 527, and in this state, the color filter 500 with the first electrode 523 and the first alignment layer 524 is attached thereto. Thereafter, liquid crystal molecules to constitute the liquid crystal layer 522 are injected into a port in the sealant 529, and the port is sealed. Then, both the polarizers and the backlight are superposed.

The liquid droplet ejection apparatus 1 according to the embodiment can apply a spacer material (functional liquid) to define the cell gap and can also uniformly apply liquid crystal molecules (functional liquid) to a region surrounded by the sealant 529 before the counter substrate 521 and the liquid crystal apparatus 520 are attached together. The functional liquid droplet ejection head 17 can perform printing on the sealant 529. The functional liquid droplet ejection head 17 can also perform coating of the first alignment layer 524 and the second alignment layer 527.

FIG. 12 is a cross-sectional view illustrating main portions of a general structure of a second example of a liquid crystal apparatus that includes the color filter 500 manufactured according to the embodiment.

One major difference between a liquid crystal apparatus 530 and the liquid crystal apparatus 520 is that the color filter 500 in FIG. 12 is disposed at the lower side in the drawing (remote from an observer).

The liquid crystal apparatus 530 includes the color filter 500, a counter substrate 531 (e.g., a glass substrate), and a liquid crystal layer 532 being made of a super twisted nematic (STN) liquid crystal composite and being sandwiched between the color filter 500 and the counter substrate 531. Although not illustrated, a polarizer is disposed adjacent to an outer surface of each of the counter substrate 531 and the color filter 500.

A plurality of first electrodes 533 are spaced at predetermined intervals on the overcoat layer 509 of the color filter 500 (adjacent to the liquid crystal layer 532). Each of the first electrodes 533 has a strip shape whose longer side extends in a direction of the back side of the drawing. A first alignment layer 534 is formed so as to cover a surface of the first electrode 533 that is remote from the color filter 500.

A plurality of second electrodes 536 are spaced at predetermined intervals on a surface of the counter substrate 531 that faces the color filter 500. Each of the second electrodes 536 has a strip shape whose longer side extends in a direction substantially orthogonal to the longer side of the first electrode 533 disposed adjacent to the color filter 500. A second alignment layer 537 is formed so as to cover a surface of the second electrode 536 that is adjacent to the liquid crystal layer 532.

The liquid crystal layer 532 is provided with one or more spacers 538 for maintaining the thickness of the liquid crystal layer 522 constant and a sealant 539 for preventing the liquid crystal composite in the liquid crystal layer 522 from leaking out.

As in the case of the liquid crystal apparatus 520, the intersections of the first electrodes 533 and the second electrodes 536 correspond to pixels, and the colored layers 508R, 508G, and 508B of the color filter 500 are positioned in the pixels.

Figure 13:
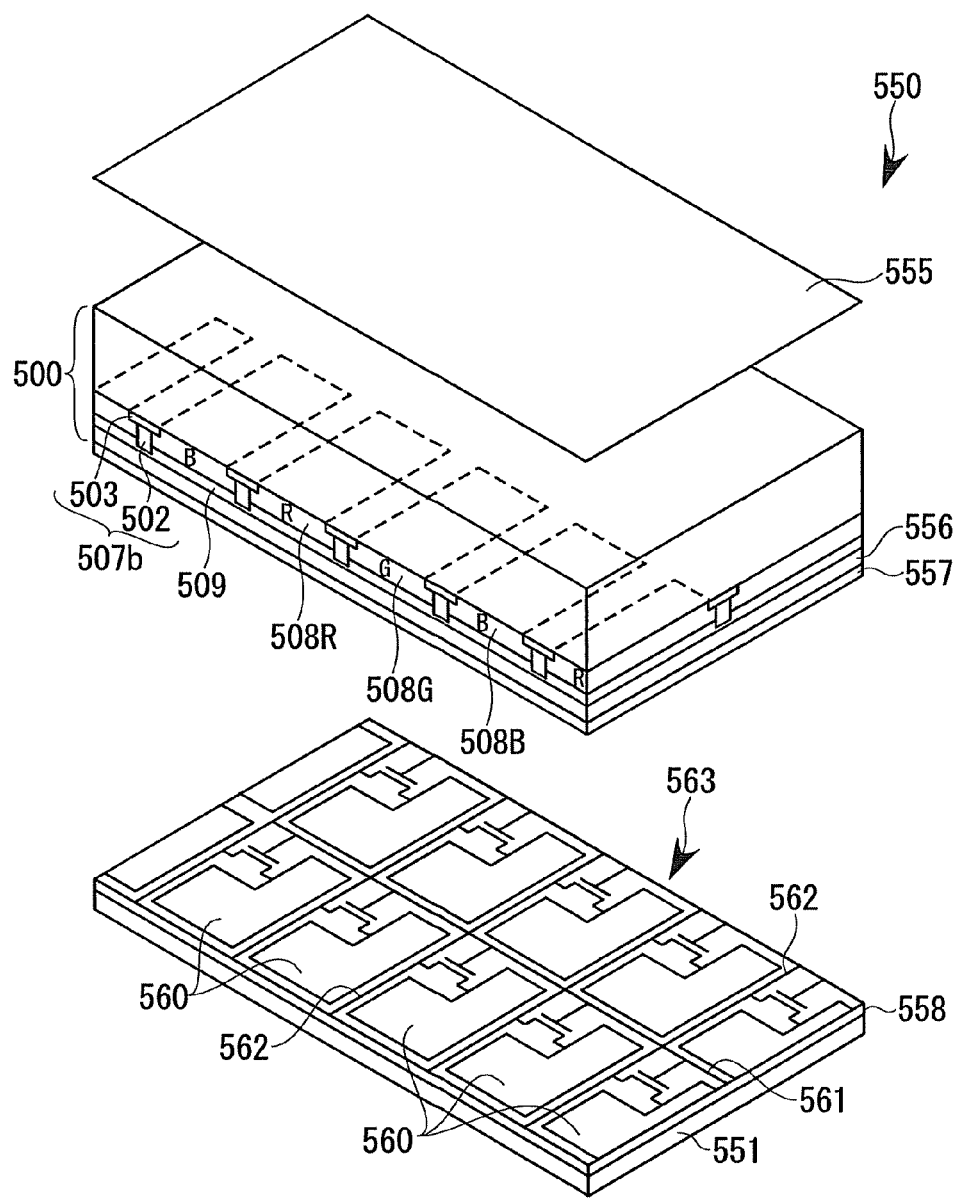
FIG. 13 is an exploded perspective view of main portions of a general structure of a third example of a liquid crystal apparatus that includes a color filter to which an aspect of the invention is applied.

FIG. 13 is an exploded perspective view of main portions of a general structure of a transmissive thin film transistor (TFT) liquid crystal apparatus 550 as a third example of a liquid crystal display that includes the color filter 500, to which an aspect of the invention is applied.

The color filter 500 in the liquid crystal apparatus 550 is disposed at the upper side in the drawing (adjacent to an observer).

The liquid crystal apparatus 550 includes the color filter 500, a counter substrate 551 opposed to the color filter 500, a liquid crystal layer (not shown) sandwiched therebetween, a polarizer 555 above the color filter 500 (adjacent to an observer), and a polarizer (not shown) below the counter substrate 551.

An electrode 556 for driving liquid crystal molecules is disposed on a surface of the overcoat layer 509 of the color filter 500 (a surface adjacent to the counter substrate 551). The electrode 556 is made of a transparent conductive material (e.g., ITO) and is formed so as to cover the entire area on which pixel electrodes 560, which are described below, are formed. An alignment layer 557 is disposed so as to cover a surface of the electrode 556 that is adjacent to the pixel electrodes 560.

An insulating layer 558 is disposed on a surface of the counter substrate 551 that faces the color filter 500. Scanning lines 561 and signal lines 562 substantially orthogonal thereto are disposed on the insulating layer 558. The pixel electrodes 560 are formed in areas surrounded by the scanning lines 561 and the signal lines 562. Although not shown, another alignment layer is disposed on the pixel electrodes 560.

A thin film transistor 563 including a source electrode, a drain electrode, a semiconductor, and a gate electrode is incorporated in a region surrounded by a notch of each of the pixel electrodes 560, the scanning lines 561, and the signal lines 562. Application of a signal to the scanning line 561 and the signal line 562 switches the thin film transistor 563 on and off, thereby enabling control of energization to the pixel electrode 560.

The liquid crystal apparatuses 520, 530, 550 described above are of the transmissive type. However, they may be a reflective or transflective liquid crystal apparatus by having a reflective layer or transflective layer, respectively.

Figure 14:
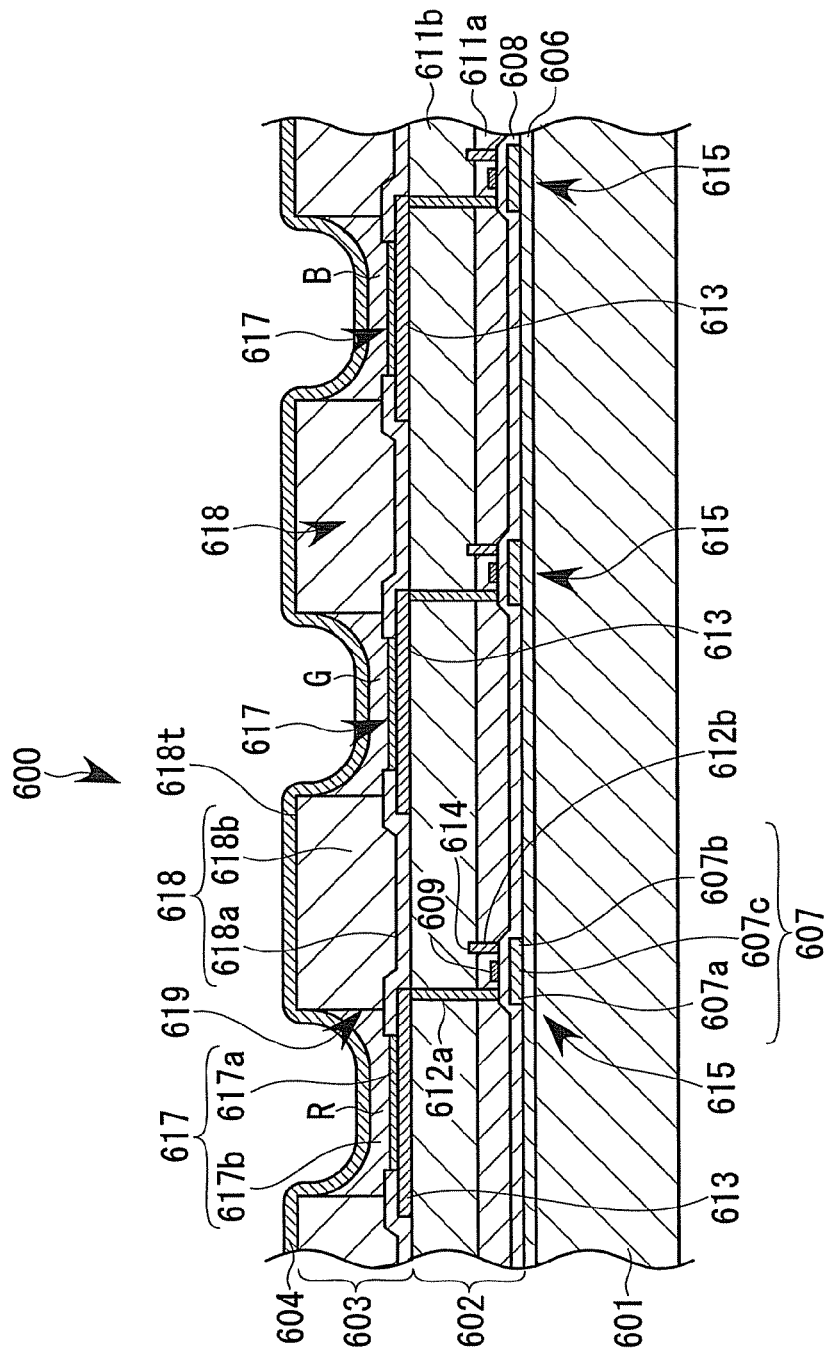
FIG. 14 is a cross-sectional view of main portions of an organic electroluminescent (EL) display apparatus.

FIG. 14 is a cross-sectional view of main portions of a display region of an organic electroluminescent (EL) apparatus (hereinafter referred to simply as a display apparatus 600).

The display apparatus 600 includes a substrate (W) 601, a circuit element portion 602, a light emitting portion 603, and a cathode 604 in sequence.

In the display apparatus 600, light emitted from the light emitting portion 603 toward the substrate 601 passes through the circuit element portion 602 and the substrate 601 and emerges therefrom toward an observer.

An underlayer overcoat layer 606 made of a silicon oxide film is disposed between the circuit element portion 602 and the substrate 601. An island-shaped semiconductor film 607 made of polycrystalline silicon is disposed on a surface of the underlayer overcoat layer 606 (a surface adjacent to the light emitting portion 603). A source region 607a and a drain region 607b are formed in the left and right areas in the semiconductor film 607 by high-concentration ion implantation. A channel region 607c lies in a region in which positive ions are not implanted.

A transparent gate insulating layer 608 covering the underlayer overcoat layer 606 and the semiconductor film 607 is disposed in the circuit element portion 602. A gate electrode 609 is disposed on the gate insulating layer 608 at a position that corresponds to the channel region 607c of the semiconductor film 607. The gate electrode 609 can be made of aluminum, molybdenum, tantalum, titanium, and tungsten. Transparent first and second interlayer insulating films 611a and 611b are stacked on the gate electrode 609 and the gate insulating layer 608. A contact hole 612a is formed so as to pass through the first and second interlayer insulating films 611a and 611b and communicate with the source region 607a. A contact hole 612b is formed so as to pass through the first interlayer insulating film 611a and communicate with the drain region 607b.

A transparent pixel electrode 613 formed into a predetermined shape by patterning is disposed on the second interlayer insulating film 611b and connected to the source region 607a through the contact hole 612a. The pixel electrode 613 can be made of ITO.

A power source line 614 is disposed on the first interlayer insulating film 611a and connected to the drain region 607b through contact hole 612b.

As described above, a driving thin film transistor 615 connected to the pixel electrode 613 is formed in the circuit element portion 602.

The light emitting portion 603 includes a functional layer 617 stacked on each of the pixel electrodes 613 and a bank portion 618 being surrounded by the functional layers 617 and the pixel electrodes 613 and partitioning the functional layers 617.

The pixel electrodes 613, the functional layers 617, and the cathode 604 disposed on the functional layers 617 constitute a light emitting element. Each of the pixel electrodes 613 is formed in a substantially rectangular shape in plan view by patterning. The bank portion 618 is disposed between the pixel electrodes 613.

The bank portion 618 includes an inorganic bank layer (first bank layer) 618a and an organic bank layer (second bank layer) 618b disposed on the inorganic bank layer 618a. The inorganic bank layer 618a can be made of an inorganic material, such as silicon monoxide (SiO), silicon dioxide ($SiO_2$), and titanium dioxide ($TiO_2$). The organic bank layer 618b can be made of a resist that has high heat resistance and high solvent resistance, such as acrylic resin or polyimide resin, and is trapezoid in cross section. The periphery of each of the pixel electrodes 613 is overlaid with a part of the bank portion 618.

An opening 619 is formed between the bank portions 618 such that the size of the opening 619 increases in an upward direction with respective to the pixel electrode 613.

Each of the functional layers 617 includes a hole injection/transport layer 617a formed in a laminated state in the opening 619 on the pixel electrode 613 and a light emitting layer 617b disposed on the hole injection/transport layer 617a. Another functional layer having a different function may be formed adjacent to the light emitting layer 617b. For example, an electron transport layer can be formed.

The hole injection/transport layer 617a has a function of transporting holes from the pixel electrode 613 and injecting the holes into the light emitting layer 617b. The hole injection/transport layer 617a is formed by ejection of a first composite (functional liquid) containing a material for forming a hole injection/transport layer. This material can be a publicly known material.

The light emitting layer 617b emits light corresponding to red (R), green (G) or blue (B) and is formed by ejection of a second composite (functional liquid) containing a material for forming a light emitting layer (light emitting material). It is preferable that a publicly known material that is insoluble in the hole injection/transport layer 617a be used as a solvent for the second composite (nonpolar solvent). The use of such a nonpolar solvent can form the light emitting layer 617b without redissolving the hole injection/transport layer 617a.

The light emitting layer 617b is constructed such that holes injected from the hole injection/transport layer 617a and electrons injected from the cathode 604 are recombined together in the light emitting layer to emit light.

The cathode 604 covers the entire surface of the light emitting portion 603, and functions to pass current through the functional layer 617 in cooperation with the pixel electrode 613 such that the cathode 604 and the pixel electrode 613 are paired with each other.

A process for manufacturing the display apparatus 600 will now be described below with reference to FIGS. 15 to 23.

Figure 15:
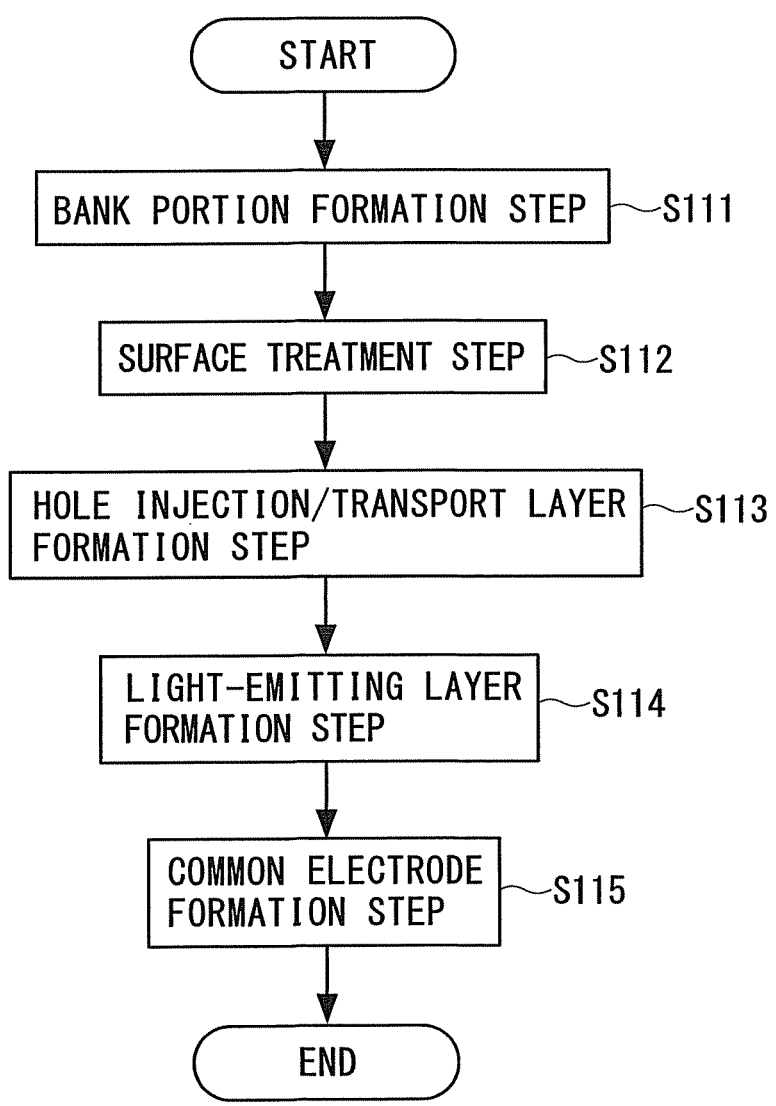
FIG. 15 is a flowchart of a process of manufacturing an organic EL display apparatus.

As illustrated in FIG. 15, the display apparatus 600 is manufactured through a bank portion formation step (S111), a surface treatment step (S112), a hole injection/transport layer formation step (S113), a light emitting layer formation step (S114), and a common electrode formation step (S115). The manufacturing process is not limited to the illustrated process. For example, any of these steps may be removed from the manufacturing process, or another step may be added thereto if needed.

Figure 16:
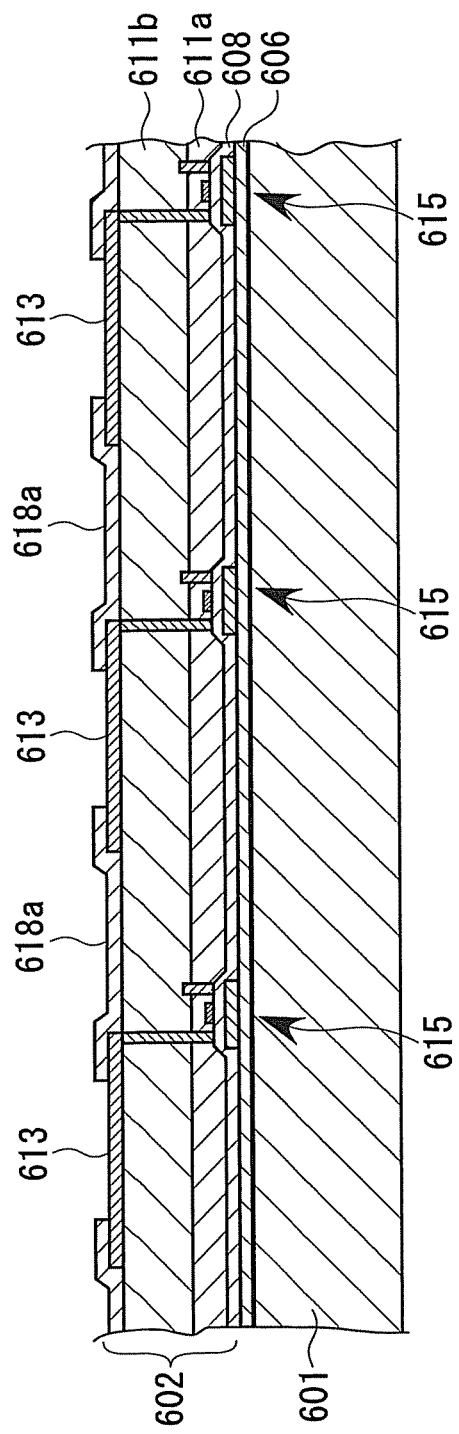
FIG. 16 is an illustration for describing a step of forming an inorganic bank layer.

First, as illustrated in FIG. 16, in the bank portion formation step (S111), the inorganic bank layer 618a is formed on the second interlayer insulating film 611b. The inorganic bank layer 618a is produced by formation of an inorganic film on a position to be formed and then patterning of the inorganic film by, for example, photolithography. At this time, a part of the inorganic bank layer 618a overlaps the periphery of the pixel electrode 613.

Figure 17:
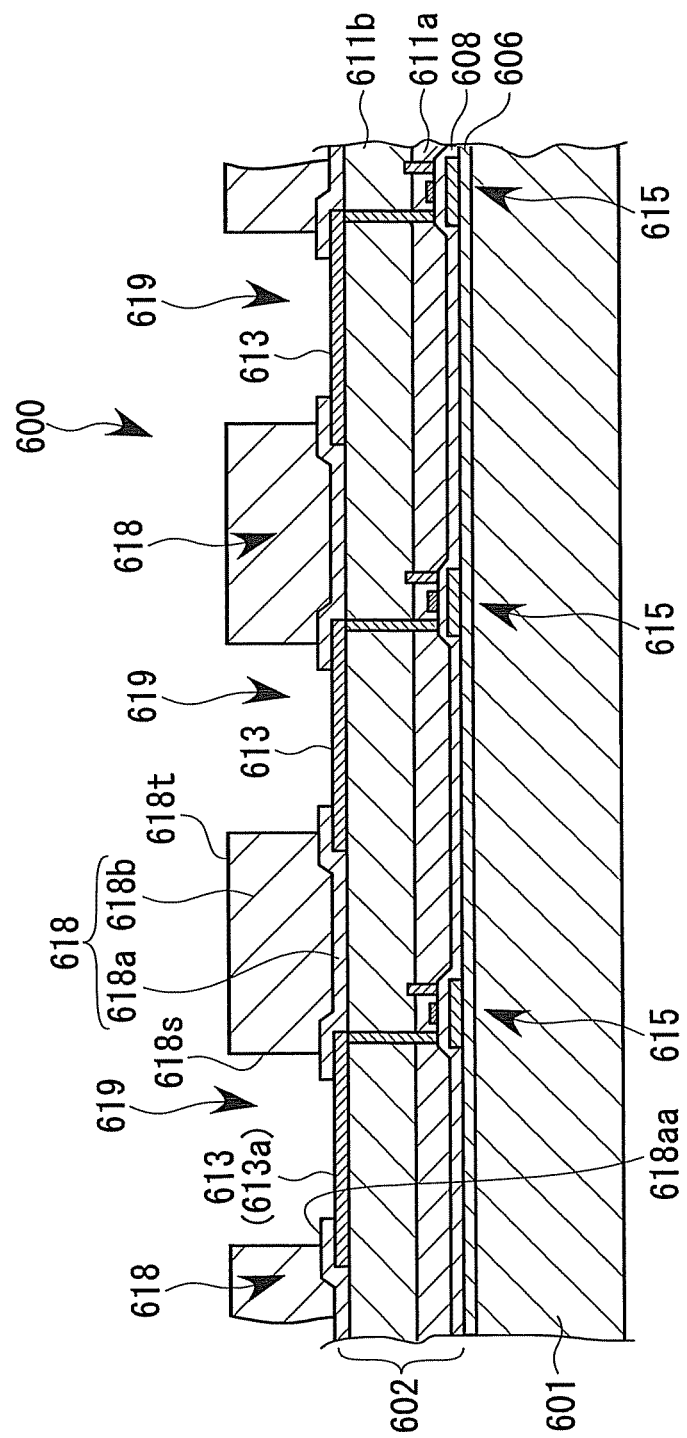
FIG. 17 is an illustration for describing a step of forming an organic bank layer.

After the inorganic bank layer 618a is formed, the organic bank layer 618b is formed on the inorganic bank layer 618a, as illustrated in FIG. 17. The organic bank layer 618b is also formed by patterning using photolithography, as in the case of the inorganic bank layer 618a.

The bank portion 618 is formed in this manner. Along with the formation of the bank portion 618, the opening 619 opened upward with respect to the pixel electrode 613 is formed between the bank portions 618. The opening 619 defines a pixel region.

In the surface treatment step (S112), lyophilic treatment and liquid repellent treatment are performed. Regions to be subjected to the lyophilic treatment are a first lamination portion 618aa in the inorganic bank layer 618a and an electrode surface 613a in the pixel electrode 613. These regions are surface-treated so as to be rendered lyophilic by, for example, plasma treatment using oxygen as processing gas. The plasma treatment also serves as cleaning for ITO of which the pixel electrode 613 is made.

The liquid repellent treatment is applied to a wall surface 618s of the organic bank layer 618b and a top surface 618t of the organic bank layer 618b. The wall surface 618s and the top surface 618t are surface-treated so as to be fluorinated (rendered liquid repellent) by, for example, plasma treatment using methane tetrafluoride as processing gas.

The performance of the surface treatment described above enables functional liquid droplets to be ejected to a targeted pixel region with more reliability when the functional layer 617 is formed using the functional liquid droplet ejection head 17 and also can prevent functional liquid droplets that have reached the target pixel region from overflowing through the opening 619.

A display apparatus base 600A is obtained through the steps described above. The display apparatus base 600A is placed on the set table 21 of the liquid droplet ejection apparatus 1, as illustrated in FIG. 2, and is subjected to the hole injection/transport layer formation step (S113) and the light emitting layer formation step (S114), which are described below.

Figure 18:
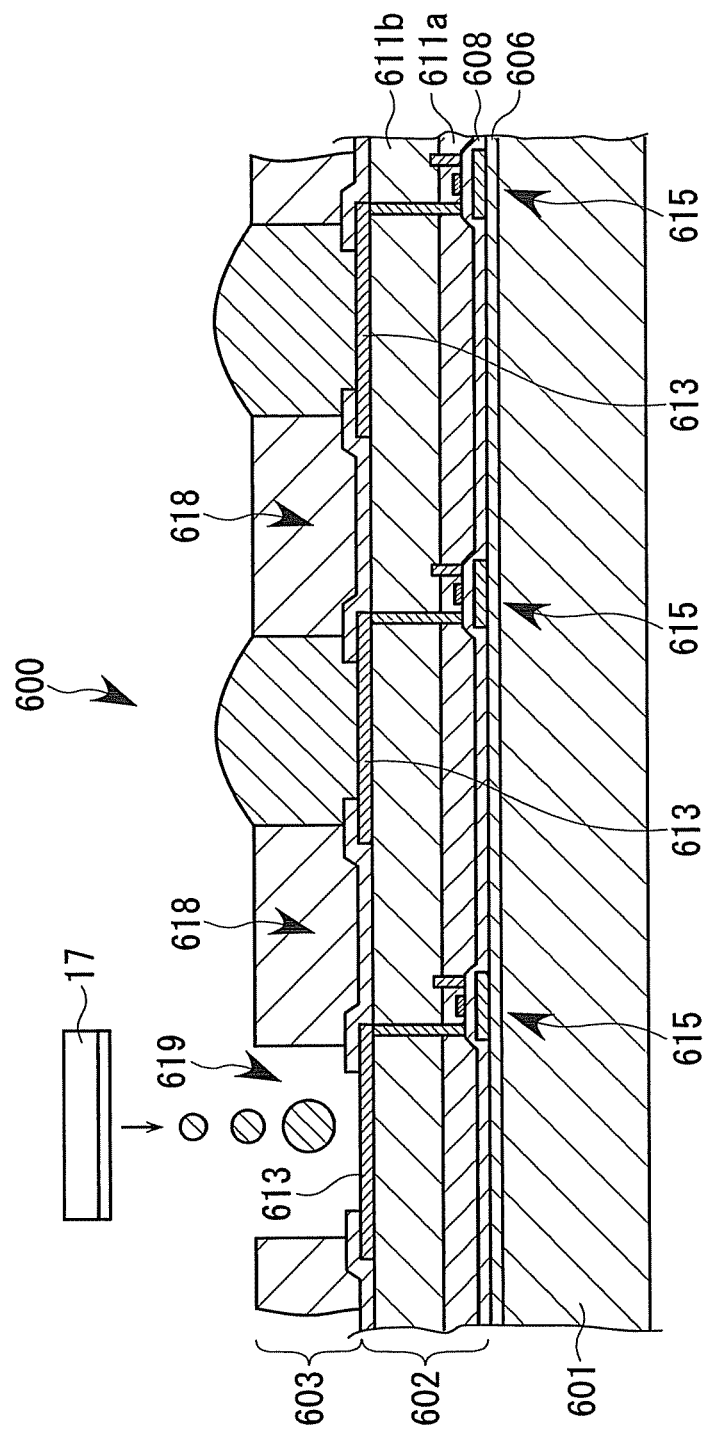
FIG. 18 is an illustration for describing a state of a step of forming a hole injection/transport layer.
Figure 19:
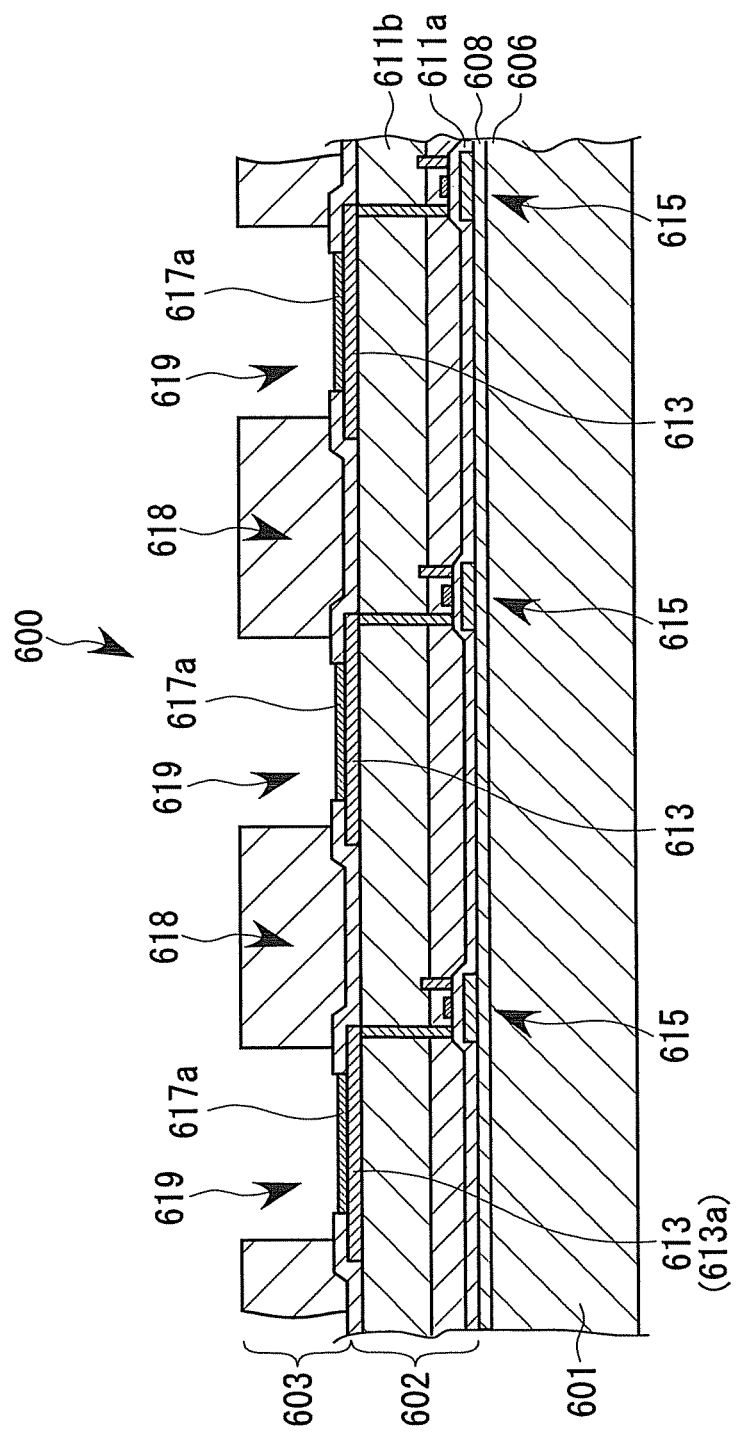
FIG. 19 is an illustration for describing a state in which the hole injection/transport layer is formed.

As illustrated in FIG. 18, in the hole injection/transport layer formation step (S113), the first composite containing the material for forming the injection/transport layer is ejected from the functional liquid droplet ejection head 17 to the opening 619 in the pixel region. Then, a polar solvent contained in the first composite is vaporized through drying treatment and heat treatment, and the hole injection/transport layer 617a is thus formed on the pixel electrode 613 (the electrode surface 613a), as illustrated in FIG. 19.

The light emitting formation step (S114) will now be described below. In this step, as previously described, a nonpolar solvent insoluble in the hole injection/transport layer 617a is used as a solvent for the second composite for use in formation of the light emitting layer in order to avoid the hole injection/transport layer 617a from being redissolved therein.

However, because the hole injection/transport layer 617a has a poor affinity for a nonpolar solvent, even when the second composite containing the nonpolar solvent is ejected onto the hole injection/transport layer 617a, it may be difficult to closely attach the hole injection/transport layer 617a and the light emitting layer 617b together or to uniformly form the light emitting layer 617b.

To address this, in order to enhance affinity of the surface of the hole injection/transport layer 617a for the nonpolar solvent and the material for forming the light emitting layer, it is preferable that the hole injection/transport layer 617a be subjected to surface treatment (surface modification treatment) before the light emitting layer is formed. This surface treatment is performed in such a manner that a surface modification material being the same or similar solvent as the nonpolar solvent for the second composite for use in the formation of the light emitting layer is applied to the hole injection/transport layer 617a and the applied surface is dried.

The performance of the treatment described above facilitates adaptation of the surface of the hole injection/transport layer 617a to the nonpolar solvent. Therefore, the second composite containing the material for forming the light emitting layer can be uniformly applied to the hole injection/transport layer 617a in the subsequent stage.

Figure 20:
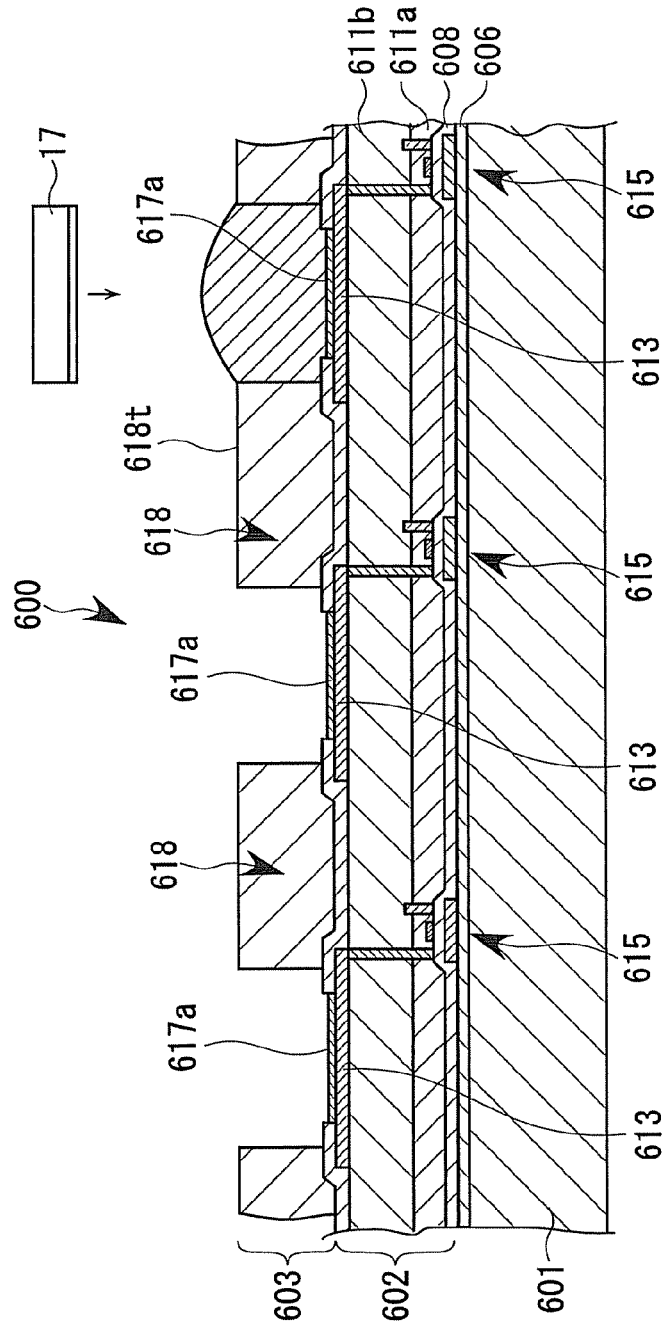
FIG. 20 is an illustration for describing a stage of a step for forming a blue light-emitting layer.

Then, as illustrated in FIG. 20, the second composite containing the material for forming the light emitting layer corresponding to any one of three colors (blue in FIG. 20) is implanted as functional liquid droplets (into the opening 619) in a corresponding pixel region by a predetermined amount. The second composite implanted in the pixel region spreads over the hole injection/transport layer 617a, and the opening 619 is filled with the second composite. Even if the second composite falls outside the pixel region and reaches the top surface 618t of the bank portion 618, since the top surface 618t has been subjected to the liquid repellent treatment, as previously described, the second composite can easily drop into the opening 619.

Figure 21:
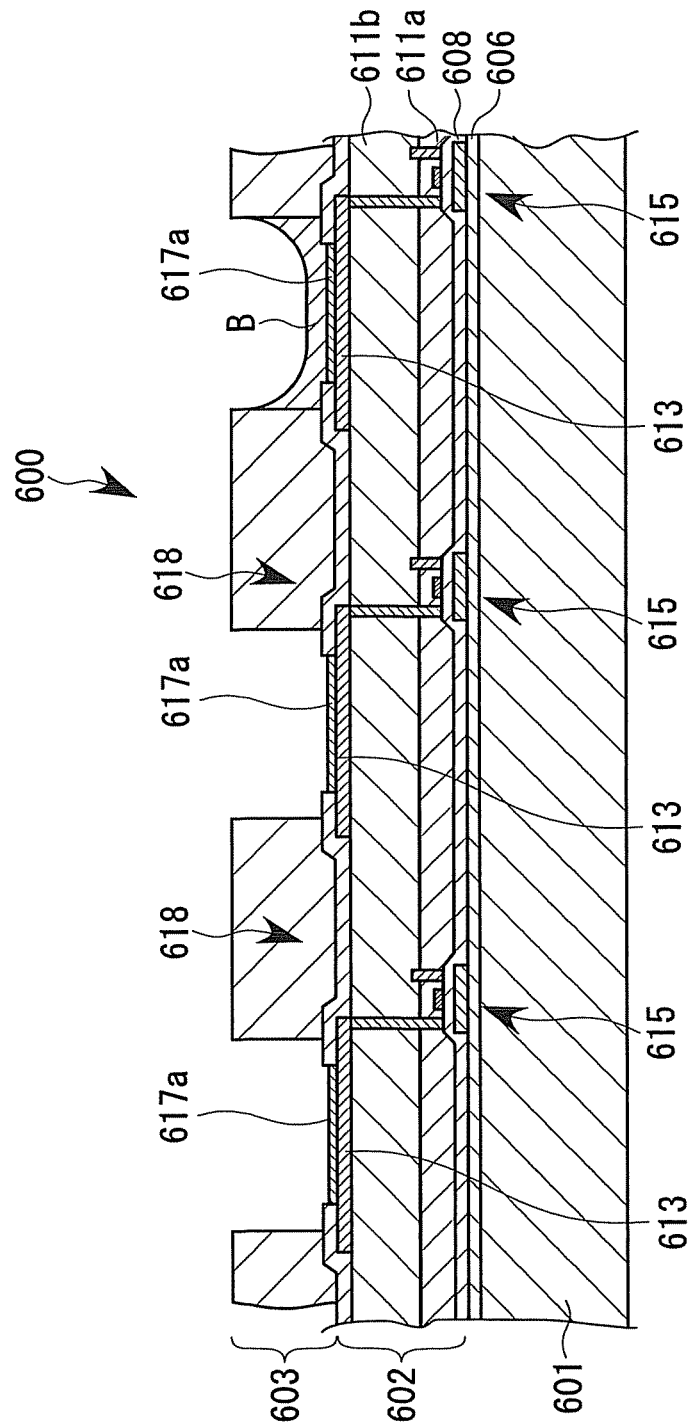
FIG. 21 is an illustration for describing a state in which the blue light-emitting layer is formed.

Thereafter, the ejected second composite is dried through drying treatment, the nonpolar solvent contained in the second composite is vaporized, and the light emitting layer 617b is thus formed, as illustrated in FIG. 21. In FIG. 21, the light emitting layer 617b corresponding to blue (B) is formed.

Figure 22:
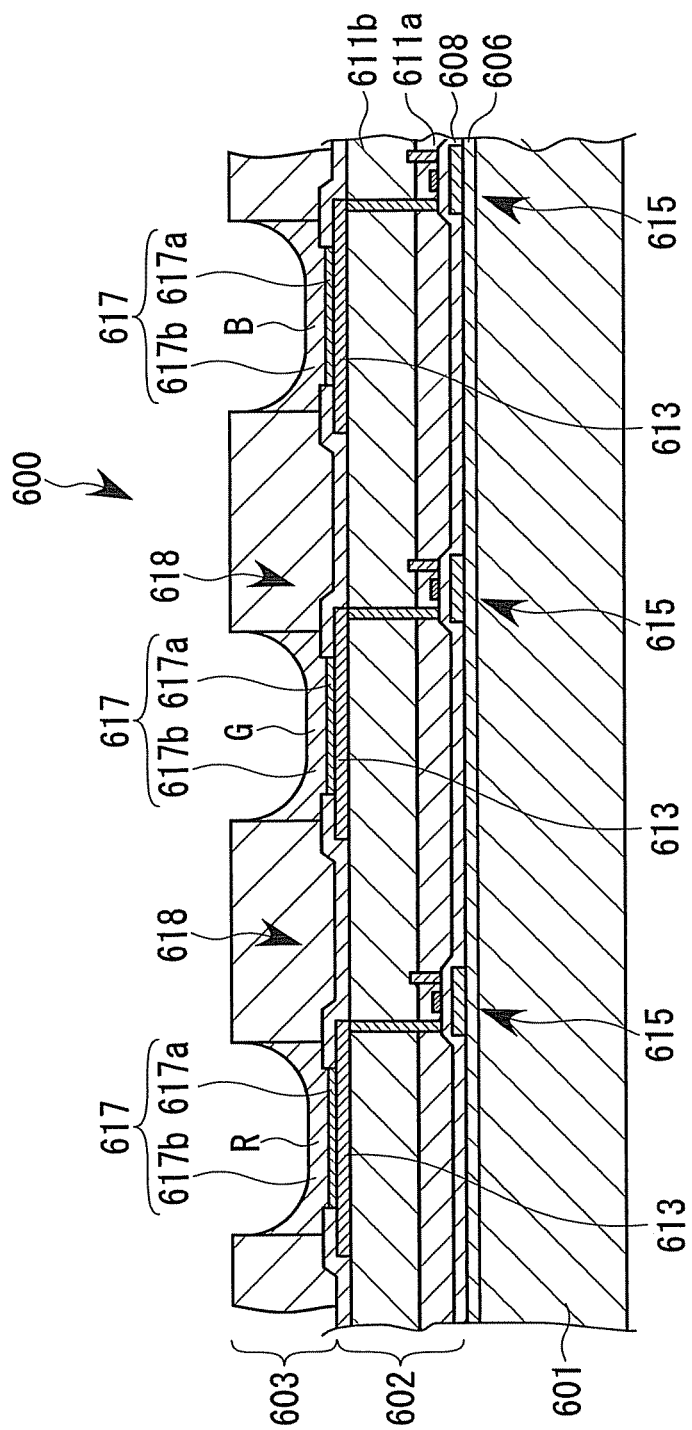
FIG. 22 is an illustration for describing a state in which color light-emitting layers are formed.

Similarly, as illustrated in FIG. 22, after the same steps as in the light emitting layer 617b for blue are sequentially performed using the functional liquid droplet ejection heads 17, the light emitting layers 617b for the other colors (red (R) and green (G)) are formed. The order of formation of the light emitting layers 617b is not limited to that described above. The light emitting layers 617b can be formed in any order. For example, the order of formation can be determined depending on materials for forming the light emitting layers. Examples of a layout pattern of the three colors of RGB include a stripe pattern, a mosaic pattern, and a delta pattern.

As described above, the functional layer 617, that is, the hole injection/transport layer 617a and the light emitting layer 617b, are formed on the pixel electrode 613. Flow proceeds to the common electrode formation step (S115).

Figure 23:
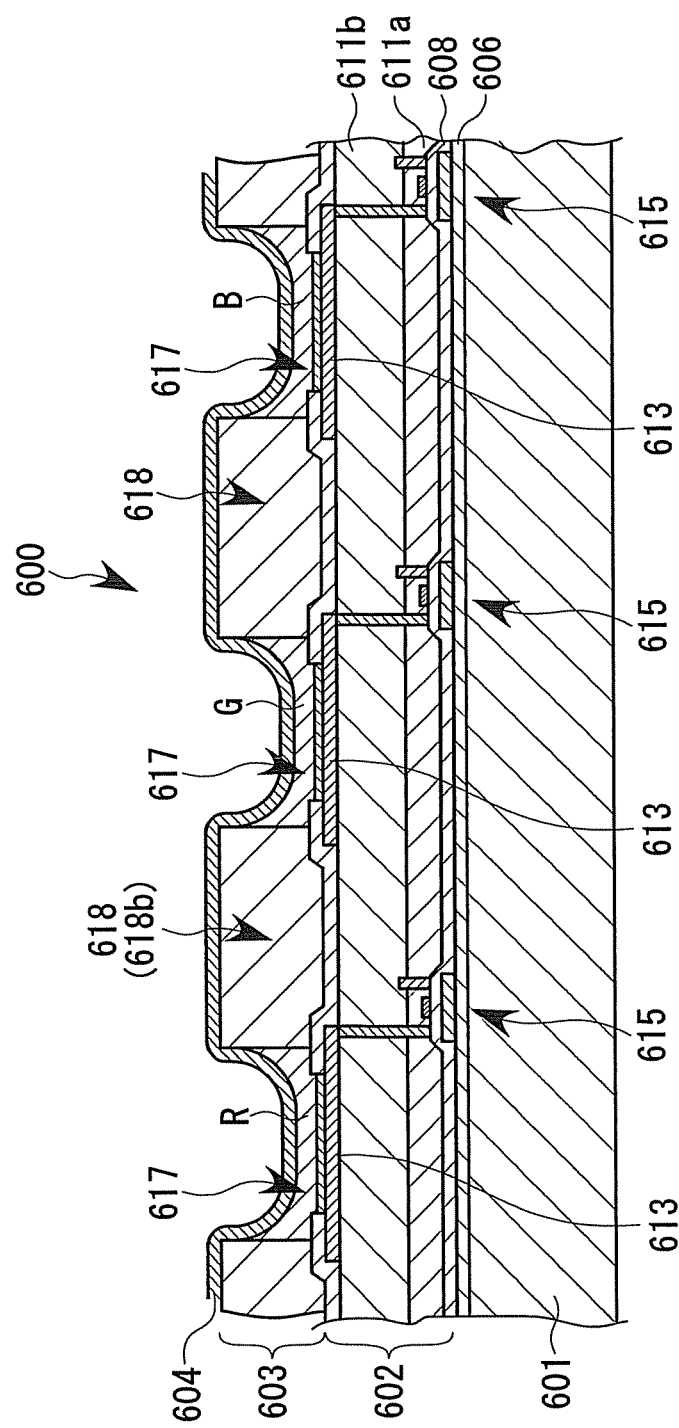
FIG. 23 is an illustration for describing formation of a cathode.

In the common electrode formation step (S115), as illustrated in FIG. 23, the cathode 604 (common electrode) is formed on the entire surfaces of the functional layer 617 and the organic bank layer 618b by, for example, vapor deposition, sputtering, or chemical-vapor deposition (CVD). In the present embodiment, the cathode 604 can be composed of, for example, a laminated structure of a calcium layer and an aluminum layer.

An aluminum layer or silver layer functioning as an electrode or an overcoat layer that prevents oxidation thereof and that is made of $SiO_2$ or silicon nitride (SiN) may be disposed on the cathode 604.

After the cathode 604 is formed in a manner described above, other processing, such as sealing of sealing the upper portion of the cathode 604 with a sealant and wiring, are performed, and the display apparatus 600 is thus obtained.

Figure 24:
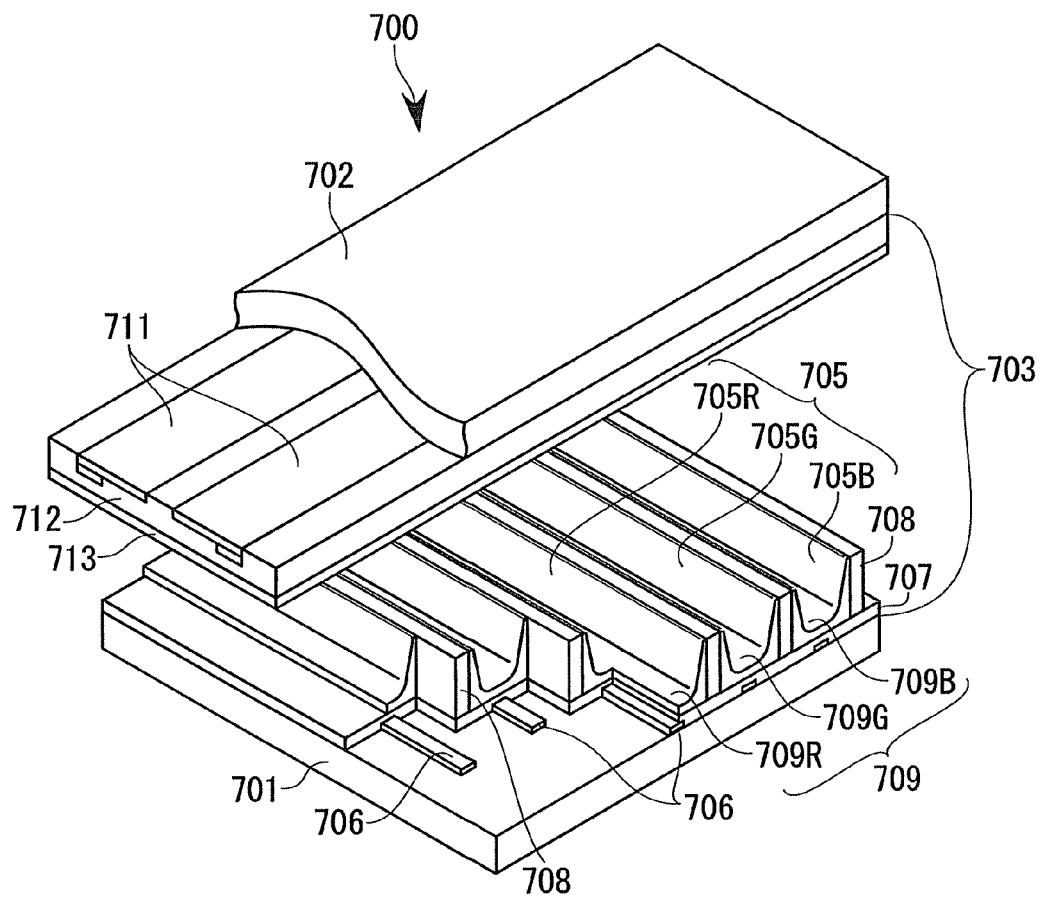
FIG. 24 is an exploded perspective view of main portions of a plasma display panel (PDP) apparatus.

FIG. 24 is an exploded perspective view of main portions of a plasma display panel (PDP) apparatus (hereinafter referred to simply as a display apparatus 700). In FIG. 24, a part of the display apparatus 700 is removed.

The display apparatus 700 includes a first substrate 701, a second substrate 702 opposed thereto, and a discharge display portion 703 defined therebetween. The discharge display portion 703 includes a plurality of discharge chambers 705. The plurality of discharge chambers 705 are arranged such that a set of three discharge chambers 705 consisting of a red discharge chamber 705R, a green discharge chamber 705G, and a blue discharge chamber 705B constitute a single pixel.

Striped address electrodes 706 are spaced at predetermined intervals on an upper surface of the first substrate 701. A dielectric layer 707 is disposed so as to cover the address electrodes 706 and the upper surface of the first substrate 701. Partitions 708 are disposed substantially vertically between the address electrodes 706 on the dielectric layer 707. The partitions 708 include, in addition to the partitions extending along the address electrodes 706 at both sides of each of the address electrodes 706 in a width direction thereof, which are described above and illustrated in FIG. 24, partitions extending in a direction orthogonal to the address electrode 706 (not shown).

Each of the discharge chambers 705 lies in a region partitioned by the partitions 708.

A phosphor 709 is disposed in each of the discharge chambers 705. The phosphors 709 include a red phosphor 709R disposed at the bottom of the red discharge chamber 705R and emitting a red fluorescence, a green phosphor 709G disposed on the bottom at the green discharge chamber 705G and emitting a green fluorescence, and a blue phosphor 709 disposed at the bottom of the blue discharge chamber 705B and emitting a blue fluorescence.

A plurality of display electrodes 711 are arranged in a striped shape at predetermined intervals on a surface of the second substrate 702 that faces downward in the drawing and extend in a direction orthogonal to the address electrodes 706. A dielectric layer 712 and an overcoat layer 713 made of, for example, magnesium oxide (MgO), are disposed so as to cover the display electrodes 711.

The first substrate 701 and the second substrate 702 opposed thereto are attached to each other such that the address electrodes 706 are the display electrodes 711 are substantially orthogonal to each other. The address electrodes 706 and the display electrodes 711 are connected to an alternating-current power supply (not shown).

Energization of the address electrodes 706 and the display electrodes 711 excite the phosphors 709 in the discharge display portion 703 and thus cause them to emit light, thus enabling color display.

According to the present embodiment, the address electrodes 706, the display electrodes 711, and the phosphors 709 can be formed using the liquid droplet ejection apparatus 1, as illustrated in FIG. 2. A process for manufacturing the address electrodes 706 on the first substrate 701 will now be described below.

In this case, the following steps are performed in a state in which the first substrate 701 is placed on the set table 21 in the liquid droplet ejection apparatus 1.

First, a liquid material (functional liquid) that contains a material for forming conductive film wiring is ejected as functional liquid droplets from the functional liquid droplet ejection heads 17 to regions where the address electrodes are to be formed. The liquid material is a material in which conductive particles (e.g., metal particles) are dispersed in a dispersion medium. Examples of the conductive particles include metal particles containing gold, silver, copper, palladium, or nickel and a conductive polymer.

After the liquid material has been supplied to all target regions where the address electrodes are to be formed, the ejected liquid material is dried to vaporize a dispersion medium contained in the liquid material. Thus, the address electrodes 706 are formed.

The formation of the address electrodes 706 is described above. The display electrodes 711 and the phosphors 709 can also be formed through the foregoing steps.

For the formation of the display electrodes 711, a liquid material (functional liquid) that contains a material for forming conductive film wiring, as in the case of the formation of the address electrodes 706, is ejected as functional liquid droplets from the functional liquid droplet ejection heads 17 to regions where the display electrodes are to be formed.

For the formation of the phosphors 709, a liquid material (functional liquid) that contains a fluorescent material corresponding to each color (R, G, B) is ejected as liquid droplets from the functional liquid droplet ejection heads 17 into a discharge chamber 705 corresponding to the color.

FIG. 25 is a cross-sectional view of main portions of an electron emission apparatus (also called an FED apparatus or SED apparatus: hereinafter, referred to simply as a display apparatus 800). In FIG. 25, a part of the display apparatus 800 is shown.

The display apparatus 800 includes a first substrate 801, a second substrate 802 opposed thereto, and a field emission display portion 803 defined therebetween. The field emission display portion 803 includes a plurality of electron emitting portions 805 arranged in a matrix.

A cathode electrode 806 including a first element electrode 806a and a second element electrode 806b is disposed on an upper surface of the first substrate 801. The first element electrode 806a and the second element electrode 806b face each other. A conductive film 807 having a gap 808 is formed in an area sandwiched between the first element electrode 806a and the second element electrode 806b. The first element electrode 806a, the second element electrode 806b, and the conductive film 807 constitute each of the electron emitting portions 805. The conductive film 807 can be made of, for example, palladium (II) oxide (PdO). The gap 808 can be generated by forming after the conductive film 807 is formed.

An anode electrode 809 is disposed on a lower surface of the second substrate 802 facing the cathode electrode 806. A grid-like bank portion 811 is disposed is disposed on a lower surface of the anode electrode 809. A phosphor 813 is arranged in each of downward openings 812 surrounded by the bank portion 811 so as to correspond to the electron emitting portion 805. The phosphors 813 include a red phosphor 813R, a green phosphor 813G, and a blue phosphor 813B for emitting a red fluorescence, a green fluorescence, and a blue fluorescence, respectively, which are arranged in a pattern described above in the openings 812.

The first substrate 801 and the second substrate 802 having the structure described above are attached together with a minute gap therebetween. The display apparatus 800 causes electrons emitted from the cathode electrode 806 or the second element electrode 806b through the conductive film 807 (gap 808) to strike the phosphor 813 disposed on the anode electrode 809, excites the electrons, and emits light. Therefore, the display apparatus 800 can realize color display.

In this case, similar to the other embodiments, the first element electrode 806a, the second element electrode 806b, the conductive film 807, and the anode electrode 809 can be formed using the liquid droplet ejection apparatus 1. In addition, the phosphors 813R, 813G, and 813B can also be formed using the liquid droplet ejection apparatus 1.

Figure 26A:
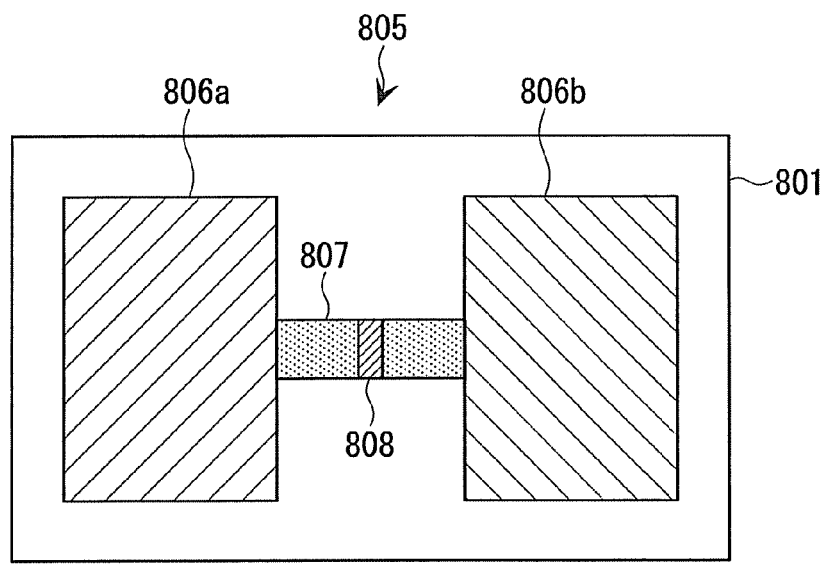
FIG. 26A is a plan view of an electron emitting portion and its surroundings.
Figure 26B:
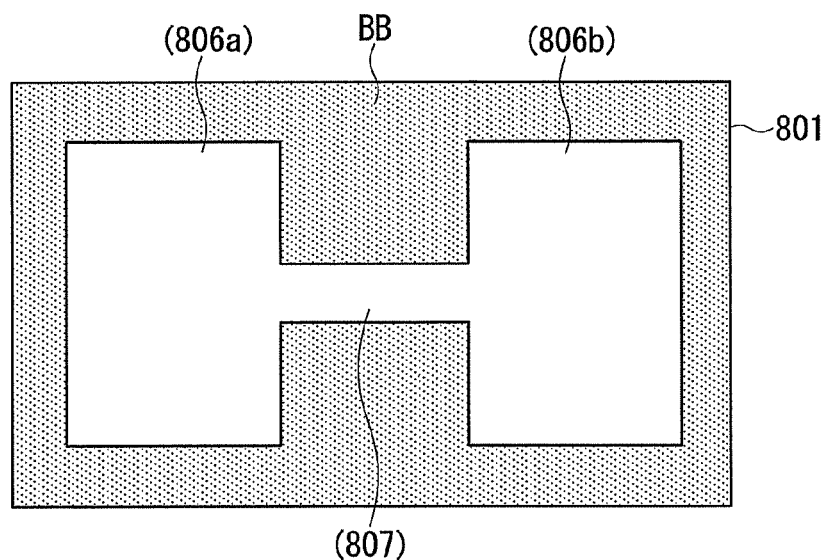
FIG. 26B is a plan view for describing a method for forming the electron emitting portion.

The first element electrode 806a, the second element electrode 806b, and the conductive film 807 have a shape in plan view illustrated in FIG. 26A. To form these film and electrodes, as illustrated in FIG. 26B, a bank portion BB is formed in advance by, for example, photolithography in a region except a portion in which the first element electrode 806a, the second element electrode 806b, and the conductive film 807 are to be built. Then, the first and the second element electrodes 806a and 806b are formed in a groove defined by the bank portion BB (by an ink jet method using the liquid droplet ejection apparatus 1), and the used solvent is dried and a film is formed. Thereafter, the conductive film 807 is formed (by the ink jet method using the liquid droplet ejection apparatus 1). After the conductive film 807 is formed, the bank portion BB is removed (by ashing removal), and the processing proceeds to the forming process described above. Preferably, as in the case of the organic EL apparatus, the first substrate 801 and the second substrate 802 may be subjected to lyophilic treatment, and liquid repellency treatment may be subjected to the bank portions 811 and BB.

Other examples of the electro-optical apparatus include apparatuses for forming metallic wiring, a lens, a resist, and a light diffuser. Various kinds of electro-optical apparatuses (devices) can be efficiently manufactured by using the liquid droplet ejection apparatus 1 in manufacture thereof.

What is claimed is:

1. A method for manufacturing an electro-optical apparatus using a liquid droplet ejection apparatus wherein the liquid droplet ejection apparatus includes:
    a first ink jet head that ejects a first functional liquid;
    a second ink jet head that ejects a second functional liquid; and
    a weight measuring device that measures a weight of the first functional liquid ejected from the first ink jet head,
    wherein the weight measuring device includes:
        a container;
        an electronic balance; and
        a flushing box,
    the method comprising:
    measuring a weight of the first functional liquid ejected from the first ink jet head by the weight measuring device;
    controlling a driving power for the first ink jet head on the basis of a measurement result of the weight measuring device; and
    ejecting the first functional liquid from the first ink jet head to a substrate after the driving power for the first ink jet head is controlled on the basis of the measurement result,
    the step of measuring the weight of the first functional liquid ejected from the first ink jet head including:
        performing a measurement ejection that ejecting the first functional liquid from the first ink jet head to the container;
        ejecting the second functional liquid from the second ink jet head to the flushing box during at least a portion of the measurement ejection;
        measuring a weight of the first functional liquid ejected in the container with the electronic balance.

2. The method according to claim 1, wherein the first functional liquid and the second functional liquid are the same functional liquid.

3. The method according to claim 1, wherein the first functional liquid and the second functional liquid are different functional liquids.

4. An electro-optical apparatus manufactured by the method according to claim 1.

* * * * *